United States Patent
Tepe et al.

(10) Patent No.: US 11,680,171 B2
(45) Date of Patent: Jun. 20, 2023

(54) SELF-CLEANING, DIRT PICK-UP RESISTANT COMPOSITIONS FOR ROOF COATINGS

(71) Applicant: Henry Company, LLC, El Segundo, CA (US)

(72) Inventors: Thomas Tepe, King of Prussia, PA (US); Zhiyong Zhu, Chadds Ford, PA (US)

(73) Assignee: Henry Company, LLC, El Segundo, CA (US)

( * ) Notice: Subject to any disclaimer, the term of this patent is extended or adjusted under 35 U.S.C. 154(b) by 560 days.

(21) Appl. No.: 16/697,279

(22) Filed: Nov. 27, 2019

(65) Prior Publication Data

US 2020/0339759 A1    Oct. 29, 2020

Related U.S. Application Data

(60) Provisional application No. 62/772,713, filed on Nov. 29, 2018.

(51) Int. Cl.

| | |
|---|---|
| *C08G 77/16* | (2006.01) |
| *C09D 5/00* | (2006.01) |
| *C08G 77/08* | (2006.01) |
| *C08K 3/22* | (2006.01) |
| *C08K 3/36* | (2006.01) |
| *C08K 5/3475* | (2006.01) |
| *C08K 5/5419* | (2006.01) |
| *C08K 5/5435* | (2006.01) |
| *C08K 5/544* | (2006.01) |
| *C08K 9/06* | (2006.01) |
| *C09D 5/33* | (2006.01) |
| *C09D 183/06* | (2006.01) |
| *E04D 7/00* | (2006.01) |

(52) U.S. Cl.
CPC .............. *C09D 5/00* (2013.01); *C08G 77/08* (2013.01); *C08G 77/16* (2013.01); *C08K 3/22* (2013.01); *C08K 3/36* (2013.01); *C08K 5/3475* (2013.01); *C08K 5/544* (2013.01); *C08K 5/5419* (2013.01); *C08K 5/5435* (2013.01); *C08K 9/06* (2013.01); *C09D 5/004* (2013.01); *C09D 183/06* (2013.01); *E04D 7/00* (2013.01); *C08G 2150/00* (2013.01); *C08K 2003/2241* (2013.01)

(58) Field of Classification Search
CPC ...... C08G 77/16; C08G 77/08; C08K 5/5419; C08K 3/36; C08K 2003/2241; C08K 2003/2244; C08K 2003/2227; C09D 183/06

See application file for complete search history.

(56) References Cited

U.S. PATENT DOCUMENTS

| | | | |
|---|---|---|---|
| 3,923,736 A * | 12/1975 | Nitzsche | H01B 3/46 528/21 |
| 5,744,199 A * | 4/1998 | Joffre | E04B 1/948 427/427.4 |
| 6,617,303 B1 | 9/2003 | Smith et al. | |
| 2016/0347956 A1 | 12/2016 | Setzke | |

FOREIGN PATENT DOCUMENTS

| | | |
|---|---|---|
| JP | 2006193731 A | 7/2006 |
| WO | 2014097309 A1 | 6/2014 |
| WO | 2017009301 A1 | 1/2017 |

OTHER PUBLICATIONS

Freeman (Silicones, Published For The Plastics Institute, ILIFFE Books Ltd., 1962)(p. 27).*
International Search Report and Written Opinion issued in PCT/US2019/063614, dated Mar. 20, 2020.

* cited by examiner

*Primary Examiner* — Kuo Liang Peng
(74) *Attorney, Agent, or Firm* — BakerHostetler

(57) ABSTRACT

Silicone compositions and methods of using the compositions are provided. The silicone coatings can exhibit improved dirt pick-up resistance and cleanability. The silicone compositions include a polysiloxane, at least one surfactant, and optionally one or more of a pigment, a filler, a crosslinker, an adhesion promoter, a catalyst, additives or solvents.

41 Claims, 7 Drawing Sheets

Applied 04/20/2018 on Kimberton Roof

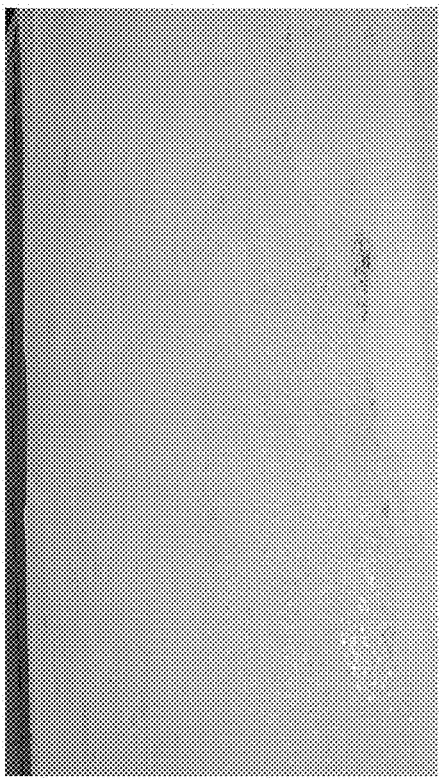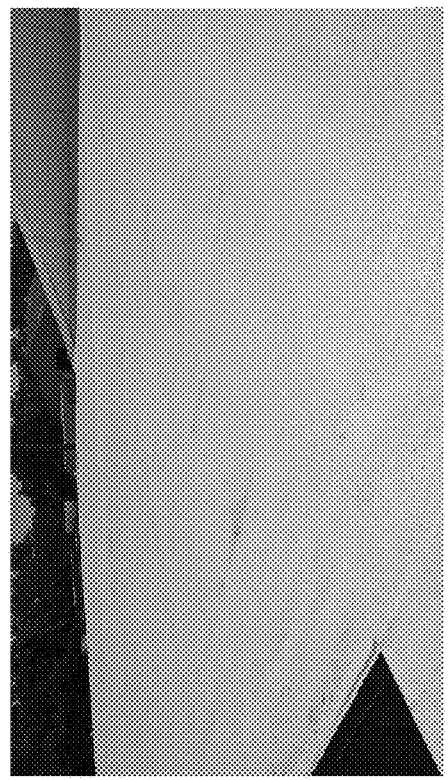
FIG 6. Actual Roof Coating

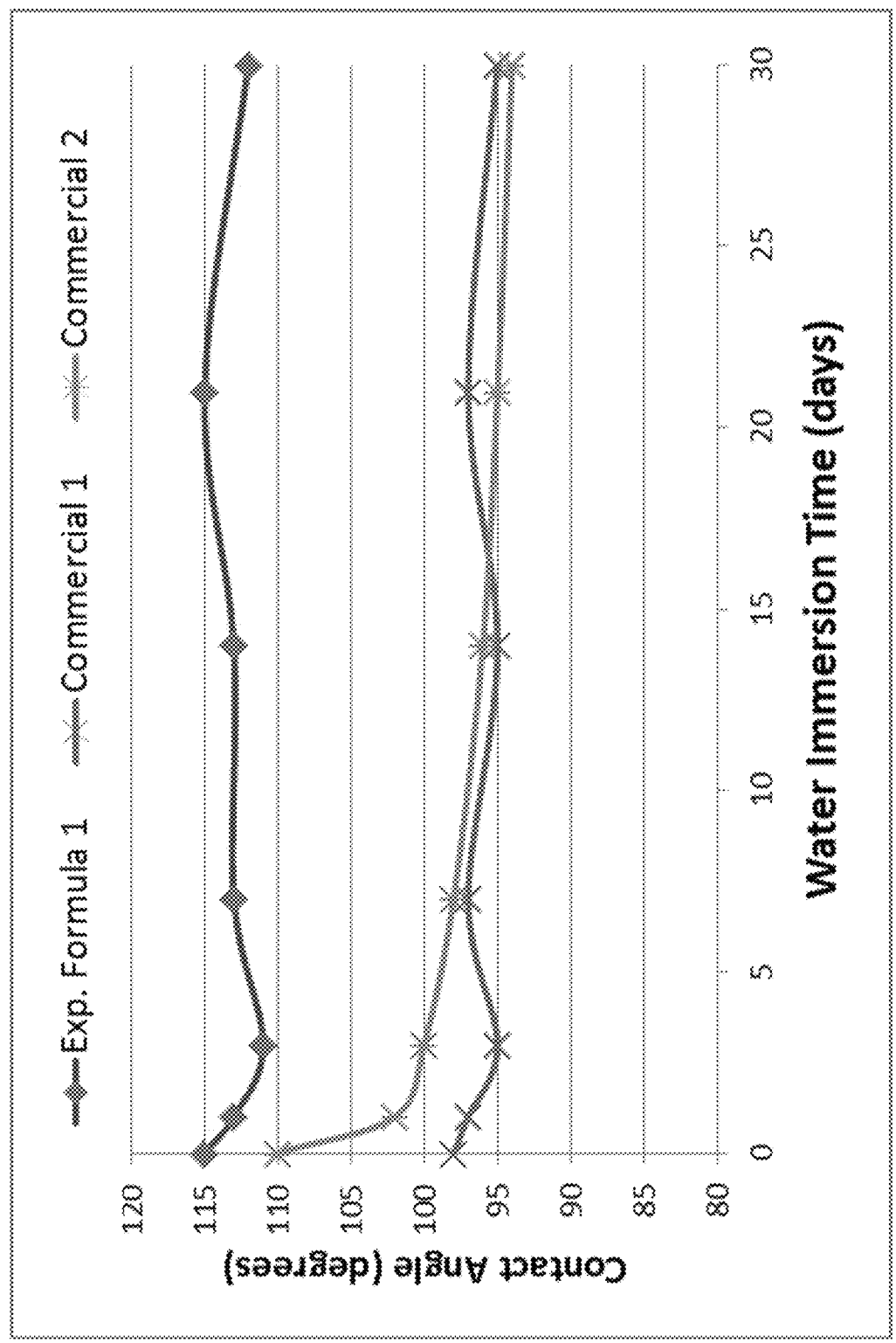
FIG. 7 – Contact Angle Measurement

SELF-CLEANING, DIRT PICK-UP RESISTANT COMPOSITIONS FOR ROOF COATINGS

CROSS REFERENCE TO RELATED APPLICATIONS

This application claims benefit under 35 U.S.C. § 119(e) of Provisional U.S. Patent Application No. 62/772,713, filed Nov. 29, 2018, the contents of which are hereby incorporated by reference in its entirety.

FIELD OF INVENTION

The present invention generally relates to roof coatings comprising chemically modified silicone compositions and methods of using these compositions. More specifically, the present invention relates to chemically modified silicone coatings, comprising at least one surfactant, that are not only resistant to dirt pick-up but are also self-cleaning.

BACKGROUND

U.S. Pat. No. 9,896,601 relates to silicone compositions that include a polysiloxane, and an ultraviolet absorber to prevent UV absorption on the coating surface. U.S. Pat. Pub. No. 20180022954 relates to an aqueous dispersion of polymer particles comprising phosphorus acid or salt thereof and a photo-initiator monomer. The invention relates to gloss retention by chemically binding photo-initiator to latex particles. Similarly, U.S. Pat. No. 9,890,290 relates to a coating composition and a multi-layered film, both of which include a fluoropolymer and a water-soluble polymer.

White roof-coatings (WRC) are trending up as popular roofing options due to their energy saving advantage. Silicone based white roof-coatings are especially of interest because they provide inherent water-proofing and extended weather durability. During their service lifetime, however, the WRCs will pick up dirt. Dirt pick-up leads to an undesired dingy appearance. It is difficult to remove dirt that collects over several weeks of outside exposure using standard cleaning methods. The loss of the aesthetic or functional qualities of the roof coating due to this soiling can result in premature or frequent maintenance or replacement. The accumulated dirt also causes solar reflectance loss, which, in turn, adversely impacts the energy saving. Accordingly, there exists a need for coatings that either accumulate less dirt or are more easily cleaned. Therefore, improved Dirt Pick-Up Resistance (DPUR) is sought for silicone coatings.

The silicone-based white roof-coatings of the present invention address the above described issues of waterproofing, weather durability, and dirt pick-up, while simultaneously offering a self-cleaning mechanism. More specifically, one component of the WRC, a surfactant, assists with cleaning of the surface, as a detergent, upon exposure to water, for example, rain water or regular wash. Not only that. Because the surfactant is chemically tethered to the silicone polymer backbone, it does not leach out and remains with the WRC system for a longer time. This invention further discloses applying a specific category of surfactant that can be used in typical silicone coating formulas, and can reduce the dirt pickup.

Not wishing to be bound by theory, however, it is speculated that the surfactant alters the surface energy of silicone coating surface, and has a reduced tendency to attract dirt accumulation. Simultaneously, however, the surfactant functions like a detergent on the surface, thus accumulation of dirt could be washed away by natural rain, and causing the "self-cleaning" property. Furthermore, this surfactant has chemical groups that can chemically interact with silicone polymer backbone, thus does not leach out, and can stay in the system for long time.

SUMMARY OF THE INVENTION

This invention relates to a composition comprising a polysiloxane; at least one surfactant; a pigment; a filler; a crosslinker; an adhesion promoter; a catalyst; and optionally one or more additives and optionally one or more solvents, wherein the polysiloxane has formula:

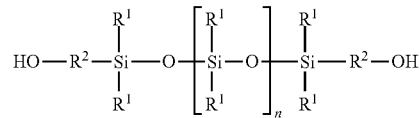

wherein:
$R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;
$R^2$ at each occurrence is independently selected from alkyl, aryl, arylalkyl and a bond; and n ranges from 10 to 1,000; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents; and
wherein said surfactant has the HLB (hydrophile-lipophile balance) range of from about 3 to 20.

This invention further relates to the composition described above, comprising 35 wt % to 60 wt % polysiloxane; 0.1 wt % to 5 wt % surfactant; 1 wt % to 12 wt % pigment; 10 wt % to 60 wt % filler; 1 wt % to 10 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

This invention also relates to the compositions described above, wherein n ranges from 160-250.

This invention further relates to the compositions described above, wherein the polysiloxane has a weight average molecular weight of 1,000 g/mol to 100,000 g/mol and a viscosity of 70 centistoke to 100,000 centistoke.

This invention further relates to the compositions described above, wherein the surfactant is selected from the group consisting of ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

This invention further relates to the compositions described above, wherein the pigment is selected from the group consisting of zinc oxide, antimony oxide, zirconium oxide, chromium oxide, iron oxide, lead oxide, zinc sulfide, titanium dioxide, lithopone, and carbon black, or any combination thereof.

This invention further relates to the compositions described above, wherein the filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, and bentonite, or any combination thereof.

This invention further relates to the compositions described above, wherein the crosslinker is selected from the group consisting of ketoxime silanes; alkoxysilanes; acetoxysilanes; isopropenoxy silanes; and a partial hydrolysate/condensate of said silanes; or any combination thereof.

This invention further relates to the compositions described above, wherein the adhesion promoter is selected from the group consisting of vinyl tris(2-methoxyethoxy) silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxy propyltriisopropenoxysilane, and 3-glycidoxypropylmethyldi isopropenoxysilane, or any combination thereof.

This invention further relates to the compositions described above, wherein the catalyst is selected from the group consisting of dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laurate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

This invention further relates to the compositions described above, comprising a solvent selected from the group consisting of mineral spirits, toluene, hexane, and xylene, or any combination thereof.

This invention further relates to the compositions described above, having a polyalkylene glycol content of 0 wt % to 20 wt %, based on wt % of binder solids.

This invention further relates to the compositions described above, wherein the at least one surfactant is selected from the group consisting of alkyl-phenol-ethoxylate surfactant, cationic surfactant, anionic surfactant, nonionic surfactant, a polyether siloxane-based surfactant and any combination thereof.

This invention further relates to the compositions described above, wherein the at least one surfactant is selected from ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

This invention further relates to the compositions described above, wherein at least one of the polysiloxane; the at least one surfactant; the pigment; the filler; the crosslinker; or the adhesion promoter includes a polyalkylene glycol tail.

This invention further relates to the compositions described above, wherein the composition has a reflectivity of 85% or more before and after the rapid rate measurement.

This invention further relates to the compositions described above, wherein the composition has a $\Delta L$ of $-30$ to 0 after 10 months of exterior exposure, measured on cleaned test panels relative to an unexposed sample of the composition.

This invention further relates to the compositions described above, wherein the composition has a $\Delta E$ of 15 or less after 10 months of exterior exposure, measured on cleaned test panels relative to an unexposed sample of the composition.

This invention further relates to the compositions described above, wherein said composition when applied as a coating has a contact angle of at least 100 before and/or after immersion in water for 30 days.

This invention further relates to the composition, comprising: a polydimethylsiloxane resin, wherein the polysiloxane has formula:

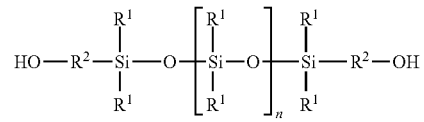

wherein $R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl; $R^2$ at each occurrence is independently selected from alkyl, aryl, arylalkyl and a bond; and n ranges from 10 to 1,000; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents; 0.2-2% of Surfonic L24-2; 11 wt % to 14 wt % titanium dioxide; 72 wt % to 78 wt % crystalline silica powder; 1 wt % to 3 wt % polydimethylsiloxane treated fumed silica; 8 wt % to 10 wt % methyltris(methylethylketoxime)silane; 1 wt % to 3 wt % (3-aminopropyl)triethoxysilane; and 0.02 wt % to 0.4 wt % tin catalyst; based on polydimethylsiloxane resin content.

This invention also relates to a method for providing a protective coating to a surface, the method comprising applying the composition according to claim 1 to at least a portion of the surface.

This invention further relates to the method above, wherein the surface is an exterior roof of a structure.

BRIEF DESCRIPTION OF THE DRAWINGS

FIG. 6 depicts an actual roof coating application of the standard and the DPUR versions; and FIG. 7 depicts the contact angle data for the Exp. Formula 1, the Commercial Sample 1, and the Commercial Sample 2.

DETAILED DESCRIPTION OF EMBODIMENTS

Figure 1:
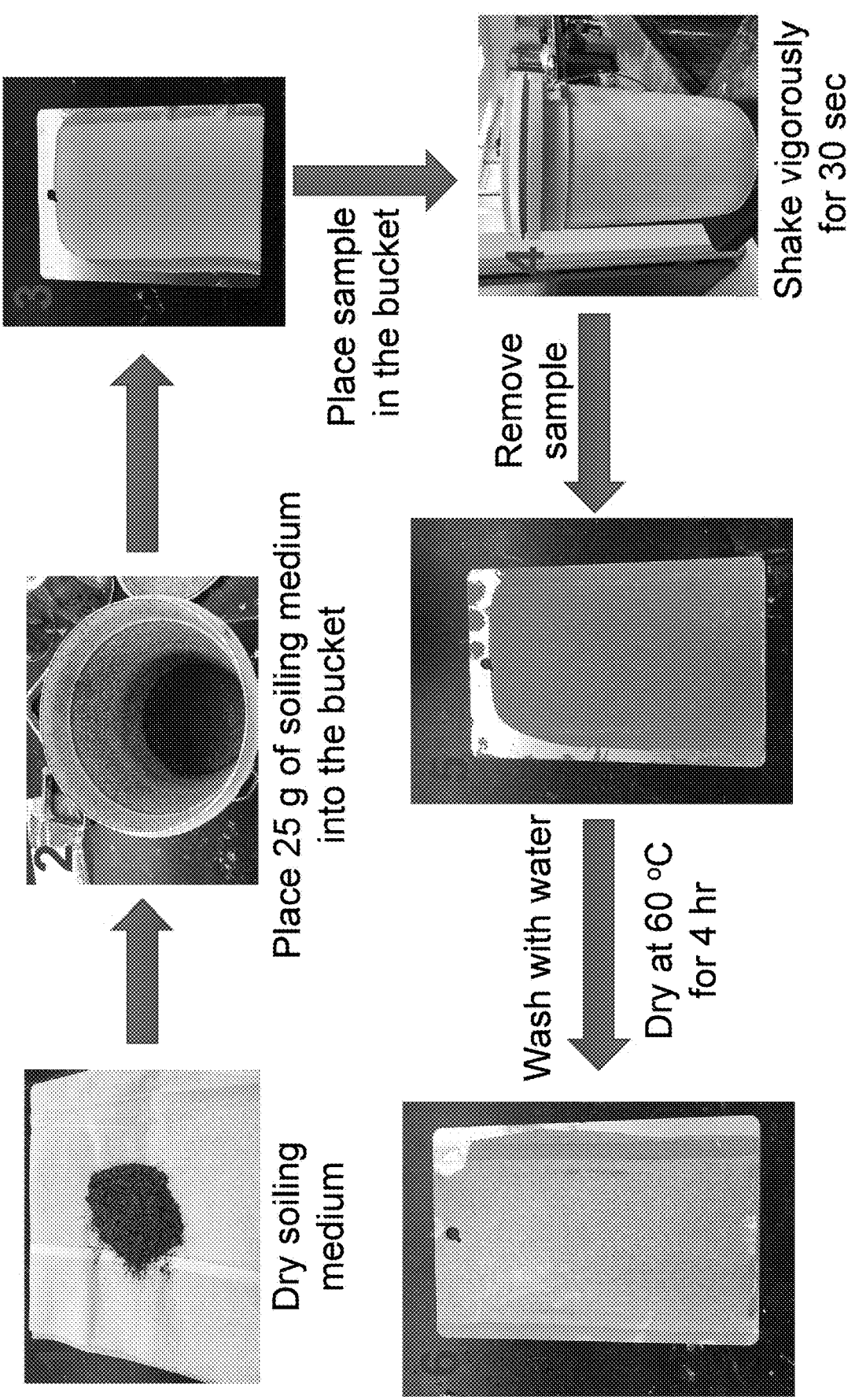
FIG. 1 depicts a laboratory process to evaluate the DPUR with standard dirt.

Disclosed herein are silicone compositions useful as protective exterior coatings, more specifically, as white roof-coatings (WRC). It has been unexpectedly found that (i) the disclosed compositions exhibit improved dirt pick-up resistance (DPUR) or cleanability, relative to conventional silicone formulations; and (ii) they are self-cleaning in that the DPUR can be rejuvenated with a wash, for example, of rain water. Consequently, use of the disclosed compositions as exterior protective coatings can result in lower maintenance or replacement costs over the coatings' lifetime. In addition, the compositions can sustain a high level of solar reflectivity relative to conventional coatings, thereby providing further savings via reduced energy consumption.

More specifically, the present invention relates to incorporating a surfactant into the WRC, such that the surfactant is chemically and/or physically bound in the matrix of the WRC, wherein the surfactant provides DPUR and self-cleanability to the WRC. Another advantage of the WRC of the present invention is their ability to rejuvenate the DPUR and self-cleanability upon washing, even by rain-water.

Without wishing to be bound by theory, it is believed the disclosed compositions exhibit the improved dirt pick-up resistance or cleanability through one or more mechanisms of action selected from an improved sheeting effect that prevents dirt spotting; an improved hardening at the coating surface that attracts and retains less dirt; reduced chemical adherence to the coating surface through action of one or more composition components (the surfactant); detergent action of the surfactant; reduced surface energy; reduction in leachability of the surfactant; and reduced charge build-up at the coating surface; or any combination thereof.

I. Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present.

The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9- 1.1. Other meanings of "about" may be apparent from the context, such as rounding off, so, for example "about 1" may also mean from 0.5 to 1.4.

As used herein, the term "suitable substituent" is intended to mean a chemically acceptable functional group (i.e., a moiety that does not negate the activity of the disclosed compositions). Illustrative examples of suitable substituents include, but are not limited to, halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl group, heteroaryl groups, aryloxy groups, heteroaryloxy groups, aralkyl groups, heteroaralkyl groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. Those skilled in the art will appreciate that many substituents can be substituted by additional substituents. As used herein, the term "alkenyl" refers a straight or branched hydrocarbon chain containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl. Alkenyl groups may be unsubstituted or substituted by one or more suitable substituents, preferably 1 to 3 suitable substituents, as defined above.

As used herein, the term "alkoxy" refers to an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

As used herein, the term "alkyl" refers to a linear or branched hydrocarbon radical, preferably containing 1 to 10 carbon atoms. The term "$C_1$-$C_6$-alkyl" is defined to include alkyl groups having 1, 2, 3, 4, 5, or 6 carbons in a linear or branched arrangement. For example, "$C_1$-$C_6$-alkyl" specifically includes methyl, ethyl, n-propyl, i-propyl, n-butyl, t-butyl, i-butyl, pentyl, and hexyl. Alkyl groups may be unsubstituted or substituted by one or more suitable substituents, preferably 1 to 3 suitable substituents, as defined above.

As used herein, the term "alkynyl" refers to a straight or branched hydrocarbon radical having 2, 3, 4, 5, 6, 7, 8, 9 or 10 carbons, and having one or more carbon-carbon triple bonds. Alkynyl groups include, but are not limited to, ethynyl, propynyl, and butynyl. Alkynyl groups may be unsubstituted or substituted by one or more suitable substituents, preferably 1 to 3 suitable substituents, as defined above.

As used herein, the term "amino" refers to an —NH$_2$ group.

As used herein, the term "aminoalkyl" refers to at least one amino group, as defined herein, appended to the parent molecular moiety through an alkyl group, as defined herein. Representative examples of aminoalkyl include, but are not limited to, aminomethyl, 2-aminoethyl, and 2-aminopropyl.

As used herein, the term "aryl" means monocyclic, bicyclic, or tricyclic aromatic radicals. Representative examples of the aryl groups include, but are not limited to, phenyl, dihydroindenyl, indenyl, naphthyl, dihydronaphthalenyl, and tetrahydronaphthalenyl. Aryl groups may be optionally substituted by one or more suitable substituents, preferably 1 to 5 suitable substituents, as defined above.

As used herein, the term "carbonyl" or "(C=O)" (as used in phrases such as alkylcarbonyl, alkyl —(C=O)—or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

As used herein, the term "cycloalkyl" refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

As used herein, the term "halogen" or "halo" refers to a fluoro, chloro, bromo or iodo radical.

As used herein, the term "haloalkyl" refers to an alkyl group, as defined herein, substituted by one, two, three, or four halogen atoms. Representative examples of haloalkyl include, but are not limited to, chloromethyl, 2-fluoroethyl, trifluoromethyl, pentafluoroethyl, 2-chloro-3-fluoropentyl, and 4,4,4-trifluorobutyl.

As used herein, the term "heteroaryl" refers to a monocyclic heteroaryl or a bicyclic heteroaryl. The monocyclic heteroaryl is a five- or six-membered ring. The five-membered ring contains two double bonds. The five-membered ring may contain one heteroatom selected from O or S; or one, two, three, or four nitrogen atoms and optionally one oxygen or sulfur atom. The six-membered ring contains three double bonds and one, two, three or four nitrogen atoms. Representative examples of monocyclic heteroaryl include, but are not limited to, furanyl, imidazolyl, isoxazolyl, isothiazolyl, oxadiazolyl, 1,3-oxazolyl, pyridinyl, pyridazinyl, pyrimidinyl, pyrazinyl, pyrazolyl, pyrrolyl, tetrazolyl, thiadiazolyl, 1,3-thiazolyl, thienyl, triazolyl, and triazinyl. The bicyclic heteroaryl includes a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl, or a monocyclic heteroaryl fused to a monocyclic heterocycle. Representative examples of bicyclic heteroaryl groups include, but are not limited to, benzofuranyl, benzothienyl, benzoxazolyl, benzimidazolyl, benzoxadiazolyl, 6,7-dihydro-1,3-benzothiazolyl, imidazo[1,2-a]pyridinyl, indazolyl, indolyl, isoindolyl, isoquinolinyl, naphthyridinyl, pyridoimidazolyl, quinazolinyl, quinolinyl, thiazolo[5,4-b]pyridin-2-yl, thiazolo[5,4-d]pyrimidin-2-yl, and 5,6,7,8-tetrahydroquinolin-5-yl. Heteroaryl groups may be unsubstituted or substituted by one or more suitable substituents, preferably 1 to 5 suitable substituents, as defined above.

As used herein, the term "heterocycle" or "heterocyclyl" refers to a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of oxygen, nitrogen, phosphorus and sulfur. The three- or four-membered ring contains zero or one double bond, and one heteroatom selected from the group consisting of oxygen, nitrogen, phosphorus and sulfur. The five-membered ring contains zero or one double bond and one, two or three heteroatoms selected from the group consisting of oxygen, nitrogen, phosphorus and sulfur. The six-membered ring contains zero, one or two double bonds and one, two, or three heteroatoms selected from the group consisting of oxygen, nitrogen, phosphorus and sulfur. The seven- and eight-membered rings contains zero, one, two, or three double bonds and one, two, or three heteroatoms selected from the group consisting of oxygen, nitrogen, phosphorus and sulfur. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, phosphinane, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydropyrimidinyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, 9-phosphabicyclo[3.3.1]nonane, 8-phosphabicyclo[3.2.1]octane, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-admantane (1-azatricyclo[3.3.1.1$^{3,7}$]decane), oxa-adamantane (2-oxatricyclo[3.3.1.1$^{3,7}$]decane), and 2,4,6-trioxa-8-phosphatricyclo

[3.3.1.1$^{3,7}$]decane. Heterocyclic groups may be unsubstituted or substituted by one or more suitable substituents, preferably 1 to 3 suitable substituents, as defined above.

As used herein, the term "hydroxy" refers to an —OH group.

As used herein, the term "hydroxyalkyl" refers to an alkyl group, as defined herein, substituted by at least one hydroxy group. Representative examples of hydroxyalkyl include, but are not limited to, hydroxymethyl, 2-hydroxyethyl, 3-hydroxypropyl, 2,3-dihydroxypropyl, 2,3-dihydroxypentyl, 4-hydroxybutyl, 2-ethyl-4-hydroxyheptyl, 3,4-dihydroxybutyl, and 5-hydroxypentyl.

A prefix attached to a multi-component substituent only applies to the first component it precedes. To illustrate, the term "alkylcycloalkyl" contains two components: alkyl and cycloalkyl. Thus, the $C^1$-$C^6$-prefix on $C^i$-$C^6$-alkylcycloalkyl means that the alkyl component of the alkylcycloalkyl contains from 1 to 6 carbon atoms; the $C^1$-$C^6$-prefix does not describe the cycloalkyl component. To illustrate further, the prefix "halo" on haloalkoxyalkyl indicates that only the alkoxy component of the alkoxyalkyl substituent is substituted with one or more halogen radicals. If the halogen substitution may only occur on the alkyl component, the substituent would instead be described as "alkoxyhaloalkyl."

A substituent is "substitutable" if it comprises at least one carbon or nitrogen atom that is bonded to one or more hydrogen atoms. Thus, for example, hydrogen, halogen, and cyano do not fall within this definition. In addition, a sulfur atom in a heterocyclyl containing such atom is substitutable with one or two oxo substituents.

If a substituent is described as being "substituted", a non-hydrogen radical is in the place of hydrogen radical on a carbon or nitrogen of the substituent. Thus, for example, a substituted alkyl substituent is an alkyl substituent in which at least one non-hydrogen radical is in the place of a hydrogen radical on the alkyl substituent. To illustrate, monofluoroalkyl is alkyl substituted with a fluoro radical, and difluoroalkyl is alkyl substituted with two fluoro radicals. It should be recognized that if there is more than one substitution on a substituent, each non-hydrogen radical may be identical or different (unless otherwise stated).

When a substituent is referred to as "unsubstituted" or not referred to as "substituted" or "optionally substituted", it means that the substituent does not have any substituents. If a substituent is described as being "optionally substituted", the substituent may be either (1) not substituted or (2) substituted. If a substituent is described as being optionally substituted with up to a particular number of non-hydrogen radicals, that substituent may be either (1) not substituted; or (2) substituted by up to that particular number of non-hydrogen radicals or by up to the maximum number of substitutable positions on the substituent, whichever is less. Thus, for example, if a substituent is described as a heteroaryl optionally substituted with up to 3 non-hydrogen radicals, then any heteroaryl with less than 3 substitutable positions would be optionally substituted by up to only as many non-hydrogen radicals as the heteroaryl has substitutable positions. To illustrate, tetrazolyl (which has only one substitutable position) would be optionally substituted with up to one non-hydrogen radical. To illustrate further, if an amino nitrogen is described as being optionally substituted with up to 2 non-hydrogen radicals, then a primary amino nitrogen will be optionally substituted with up to 2 non-hydrogen radicals, whereas a secondary amino nitrogen will be optionally substituted with up to only 1 non-hydrogen radical.

If substituents are described as being "independently selected" from a group, each substituent is selected independent of the other. Each substituent, therefore, may be identical to or different from the other substituent(s).

A coating discolors when it picks up dirt. Delta E ($\Delta E$) is measured by a spectrophotometer by comparing the coating that is exposed to dirt and the coating that is "clean" of dirt. The difference is expressed as $\Delta E$. The difference in $\Delta E$s from a "control" coating and an "experimental" coating can then be calculated. The improvement in dirt pick-up resistance can be expressed as a percentage by taking the difference in $\Delta E$ divided by the $\Delta E$ of the "control" coating. Delta E ($\Delta E$) can be calculated according to Equation (1):

$$\Delta E=[(\Delta a)^2+(\Delta b)^2+(\Delta L)^2]^{1/2} \quad (1)$$

wherein:
$\Delta L$ refers to the lightness/darkness difference;
$\Delta a$ refers to the red/green difference;
$\Delta b$ refers to the yellow/blue difference; and
$\Delta E$ refers to the total color difference that integrates the differences between the L, a, and b values of the initial and developed color.

As used herein, the term "wt % based on binder solids" or "wt % based on resin solids" refers to weight of the material per weight of solid material in the formulation minus fillers, pigments and non-film formers. Pigments are typically solids materials that add color and cannot be dissolved in standard solvents. Examples of pigments are titanium dioxide, red iron oxide, phthalocyanine blue. Fillers typically impart little or no color to a film and generally function as solids to impart economics, chemical resistance, corrosion resistance, and rheology. Examples of fillers are talc, clay, silica, and calcium carbonate. Binder solids may refer to resin solids. In certain embodiments, "wt % based on binder solids" may refer to wt % based on polysiloxane resin content. In certain embodiments, "wt % based on binder solids" may refer to wt % based on polydimethylsiloxane resin content.

As used herein, the term "exterior environment" may refer to an environment characterized by a tropical/megathermal climate, a dry (arid and semiarid) climate, a temperate/mesothermal climate, a continental/microthermal climate, or a polar or alpine climate. Such climates are delineated in the Koppen climate classification system.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

II. Silicone Compositions

Disclosed are silicone-based compositions for white roof-coating (WRC). The compositions include at least one polysiloxane, at least one surfactant, and optionally one or more pigments, fillers, crosslinkers, adhesion promoters, catalysts, solvents, or additives.

a. Polysiloxanes

The disclosed compositions include at least one polysiloxane component. The polysiloxane may be a hydroxy-terminated polysiloxane or a non-hydroxy-terminated polysiloxane. The compositions can include a combination of polysiloxanes.

In certain embodiments, the polysiloxane component has formula:

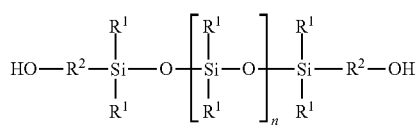

wherein $R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl; $R^2$ at each occurrence is independently selected from alkyl, aryl, arylalkyl and a bond; and n ranges from 10 to 1,000, or from 160-250, wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents.

In certain embodiments, $R^1$ at each occurrence is independently selected from alkyl, alkenyl, aryl, and arylalkyl, wherein said alkyl, alkenyl, aryl, and arylalkyl are each independently, at each occurrence, unsubstituted or substituted with one or more suitable substituents. In certain embodiments, $R^1$ is methyl at each occurrence. In certain embodiments, $R^1$ is methyl at each occurrence and $R^2$ is a bond at each occurrence.

In certain embodiments, the polysiloxane component is a hydroxy-terminated polydimethylsiloxane having formula:

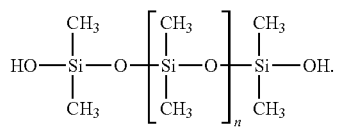

In certain embodiments, the polysiloxane component is a hydroxy-terminated polydimethylsiloxane resin having a weight average molecular weight of 1,000 g/mol to 100,000 g/mol, 3,000 g/mol to 100,000 g/mol, or 14,000 g/mol to 42,000 g/mol, and a viscosity of 70 centistoke to 100,000 centistoke or 750 centistoke to 20,000 centistoke.

The polysiloxane content of the disclosed compositions may range from 35 wt % to 65 wt %, from 40 wt % to 60 wt %, or from 45 wt % to 55 wt %, based on total weight of the composition. In certain embodiments, the polysiloxane content of the disclosed composition is about 35 wt %, about 40 wt %, about 45 wt %, about 50 wt %, about 55 wt %, about 60 wt %, or about 65 wt %, based on total weight of the composition.

The polysiloxane content of the disclosed compositions may range from 60 wt % to 100 wt %, 80 wt % to 95 wt %, or from 85 wt % to 90 wt %, based on binder solids. In certain embodiments, the polysiloxane content of the disclosed composition is about 60 wt %, about 65 wt %, about 70 wt %, about 75 wt %, about 80 wt %, about 85 wt %, about 90 wt %, about 95 wt %, or about 100 wt %, based on binder solids.

b. Surfactants

Surfactants usable for the present invention include cationic, non-ionic, or anionic surfactants, or combinations thereof. The surfactant of the present invention contains a hydrophobic group typically providing HLB (hydrophile-lipophile balance) greater than or equal to 3. The surfactant also contains a chemically reactive group that can be physically or chemically linked to silicone back bone, typically a hydroxyl group or an amine group.

Surfactants are substances which lower the surface tension of a liquid allowing easier spreading and lowering of the interfacial tension between two liquids or between a solid and a liquid. Typically, surfactants have a characteristic structure and have at least one hydrophilic and at least one hydrophobic functional group. If both parts of the molecule are in equilibrium relative to one another, the substance will accumulate and orient itself at an interface, i.e., hydrophilic groups point, for example, to an aqueous phase and the hydrophobic groups in the direction of other solid, liquid or gaseous phases. A further special feature of the surfactants is the formation of higher aggregates, the so-called micelles. With these, the surfactant molecules arrange themselves in such a way that the polar groups form, for example, a spherical shell. This has the effect of solubilizing substances such as dirt particles in an aqueous solution with the formation of micelles.

HLB

Hydrophilic/lipophilic balance (HLB) is a measure of the degree to which a material is hydrophilic or lipophilic. It is a measure of water solubility and ability to give good emulsification which are critical properties for a cleaning composition.

For the purposes of the present invention the Griffin's method is used for determining the hydrophilic/lipophilic balance wherein HLB is defined as: HLB=20*Mh/M wherein: Mh is the molecular mass of the hydrophilic portion of the molecule and M is the molecular mass of the molecule.

In general, formulations with an HLB value of less than about 10 tend to be poorly soluble in water. And an HLB value of greater than about 10 is a water soluble, lipid insoluble molecule.

A value from 7 to 11 indicates a W/O (water in oil) emulsifier A value from 12 to 16 indicates 0/W (oil in water) emulsifier. A value from 11 to 14 indicates a wetting agent. A value from 12 to 15 indicates a detergent. A value of 16 to 20 indicates a solubilizer or hydrotrope.

Surfactant Embodiments

In one embodiment of the present invention, a surfactant is added during the dispersion of the silylated resin in a waterborne system. The surfactant may be either an alkyl-phenol-ethoxylate (APEO) surfactant or an APEO free surfactant. According to another embodiment of the present invention, the surfactant is a cationic, anionic or non-ionic surfactant, or a polyether siloxane-based surfactant or any combination thereof.

According to yet another embodiment of the present invention, a surfactant having a hydrophilic-lipophilic balance (HLB) of 13 is used.

According to another embodiment of the present invention, the surfactant can be a package of several surfactants with different HLB values ranging from about 3 to about 20 or a package of non-ionic surfactant including a siloxane surfactant.

According to another embodiment of the present invention, the surfactant can be selected from the group consisting of alkyl-phenol-ethoxylate surfactant, cationic surfactant, anionic surfactant, non-ionic surfactant, a polyether siloxane-based surfactant and any combination thereof. Specific examples of the surfactants include ethoxylated alcohols, ethoxylated sorbitan esters, ethoxylated fatty acids, ethoxylated fatty esters, fatty esters, alkyl sulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

Alkoxylate Surfactants

The compositions may include one or more alkoxylate surfactants, which serve as a surfactant and as a dirt remover. In an embodiment, the alkoxylate surfactant may be nonionic. In one embodiment, the alkoxylate surfactant may be branched. Examples of suitable alkoxylate surfactants include branched, nonionic alkyl polyethylene glycol ethers made from Guerbet alcohols and ethylene oxide. Alkylene oxides other than ethylene oxide can also be used. For example, branched nonionic alkyl polyethylene/polypropylene glycol ethers may also be suitable for use, e.g., made from Guerbet alcohols and ethylene oxide and propylene oxide. As will be appreciated by those of skill in the art, Guerbet alcohols may have the structure shown below:

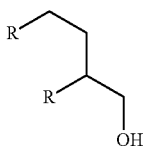

where R is an alkyl group (e.g., as derived from a primary aliphatic alcohol in a Guerbet reaction). In an embodiment, each R may independently represent an alkyl group having from 3 to 22, from 6 to 18, from 6 to 16, from 6 to 14, or from 8 to 12 carbons (e.g., $C_3$, $C_4$, $C_6$, $C_8$, $C_{10}$, $C_{12}$, $C_{14}$, $C_{16}$, $C_{18}$, $C_{20}$, or any range defined between two of any such alkyl groups). In an embodiment, both R groups may be identical, although in other embodiments they may differ from one another.

Exemplary branched nonionic alkyl polyethylene glycol ethers (e.g., made from a Cio Guerbet alcohol and 2 alkylene oxides, namely ethylene oxide and propylene oxide) include the LUTENSOL® XL series of surfactants, such as LUTENSOL® XL 40, LUTENSOL® XL 50, LUTENSOL® XL 60, LUTENSOL® XL 70, LUTENSOL® XL 79, LUTENSOL® XL 80, LUTENSOL® XL 89, LUTENSOL® XL 90, LUTENSOL® XL 99, LUTENSOL® XL 100, and LUTENSOL® XL 140, available from BASF Corporation (Florham Park N.J.). The LUTENSOL® XP series of surfactants available from BASF Corporation may also be suitable for use. A combination of different branched nonionic alkyl polyethylene glycol ethers may be used.

In addition to, or alternative to the branched nonionic alkyl polyethylene glycol ethers, some linear nonionic alcohol ethoxylate or other alkoxylate surfactants may be suitable for use as the alkoxylate surfactant. Examples of such include the SURFONIC® L series of surfactants, particularly the SURFONIC® L12 series of surfactants (e.g., lauryl alcohol ethoxylates). An example of such is SURFONIC® L12-8, available from HUNTSMAN Corporation (Woodlands, Tex.). Other examples of alkoxylate surfactants include the PLURAFAC® series of surfactants, such as PLURAFAC® SL-62, available from BASF Corporation. Alcohol ethoxylate surfactants may be made by reaction of a primary or secondary alcohol (e.g., $C_4$ to $C_{22}$, $C_6$ to $C_{18}$, $C_8$ to $C_{16}$) with ethylene oxide ($C_2H_4O$). Often the number of moles of ethoxylation is proprietary to the surfactant manufacturer, although this degree of ethoxylation is often from about 4 moles to about 12 moles, or from about 6 moles to about 10 moles. Other alcohol ethoxylate surfactants that may be suitable for use are available from STEPAN, DOW, and others.

By way of example, LUTENSOL® XL 70, LUTENSOL® XL 80, LUTENSOL® XL 90, and SURFONIC® L12-8 have moles of ethoxylation values of 7, 8, 9, and 8, respectively. Higher moles of ethoxylation may aid in raising the cloud point of the composition, so as to increase shelf stability (e.g., particularly under elevated temperature storage conditions). Addition of an anionic surfactant (e.g., an alkyl sulfate) may also aid in increasing such stability.

The alkoxylate surfactant may have a hydrophilic-lipophilic balance ("HLB") value from 10 to 20. For example, LUTENSOL® XL 70, LUTENSOL® XL 80, LUTENSOL® XL 90, and PLURAFAC® SL-62 have HLB values of 12, 13, 14, and 14, respectively. Where a blend of a plurality of alkoxylate surfactants is used, one of the alkoxylate surfactants may have more moles of ethoxylation and/or a higher HLB value than another of the included alkoxylate surfactants (e.g., a blend of LUTENSOL® XL 70 and LUTENSOL® XL 90).

Where a blend of multiple alkoxylate surfactants is included, the alkoxylate surfactant having a lower HLB value and/or lower moles of ethoxylation may dominate. For example, a weight ratio of the alkoxylate surfactant having lower HLB and/or lower moles of ethoxylation may be from 1.5:1 to 4:1, from 2:1 to 3.5:1, or from 2.5:1 to 3:1. In another embodiment, the blend may be formulated with substantially equal weight percentages of each of the alkoxylate surfactants, or even with more of the alkoxylate surfactant with the higher HLB and/or higher moles of ethoxylation. The blend of alkoxylate surfactants may have an average HLB value of between 10 and 15, as calculated by an average of the HLB values of the alkoxylate surfactants weighted by the weight fraction of each alkoxylate surfactant in the composition.

The cumulative amount of the one or more alkoxylate surfactants (i.e., the sum total weight percent of any alkoxylate surfactants included) may be up to about 20%, up to about 15%, up to about 10%, from about 3% to about 10%, from about 3% to about 9%, from about 4% to about 8%, or from about 5% to about 8% by weight of the composition. For example, the weight percent of the alkoxylate surfactants may be about 3%, about 4%, about 5%, about 6%, about 7%, about 8%, about 9%, or about 10% by weight of the composition, or any range defined between two of such weight percent values.

According to another embodiment of the present invention, the surfactant can be selected from the group consisting of alkyl-phenol-ethoxylate surfactant, cationic surfactant, anionic surfactant, non-ionic surfactant, a polyether siloxane-based surfactant and any combination thereof. Specific examples of the surfactants include ethoxylated alcohols, ethoxylated sorbitan esters, ethoxylated fatty acids, ethoxylated fatty esters, fatty esters, alkyl sulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

Disclosure of various other suitable surfactants may be found in one or more of U.S. Pat. No. 3,929,678 to Laughlin, U.S. Pat. No. 4,259,217 to Murphy, U.S. Pat. No. 5,776,872 to Giret, et al., U.S. Pat. No. 5,883,059 to Furman, et al., U.S. Pat. No. 5,883,062 to Addison, et al., U.S. Pat. No. 5,906,973 to Ouzounis, et al., and U.S. Pat. No. 4,565,647 to Llenado. Each of the above patents is incorporated by reference.

Exemplary surfactants for the present invention are provided in Table 1 below.

TABLE 1

| Sample | Structure | Percent (%) | Initial SR | Final SR | SR Retained (%) | HLB Value | Surface Tension (mN/m) |
|---|---|---|---|---|---|---|---|
| Commercial 1 | N/A | N/A | 0.874 | 0.411 | 47.0 | N/A | N/A |
|  |  | N/A | 0.874 | 0.384 | 43.9 |  |  |
|  |  | N/A | 0.877 | 0.403 | 46.0 |  |  |
|  |  | N/A | 0.874 | 0.372 | 42.6 |  |  |
|  |  | M/A | 0.875 | 0.389 | 44.5 |  |  |
|  |  | N/A | 0.877 | 0.404 | 46.1 |  |  |
|  |  | N/A | 0.875 | 0.363 | 41.5 |  |  |
| Platinum(0)-1,3-divinyl-1,1,3,3-tetra-methyl-disiloxane complex solution, 2% solution | [structure] | 0.1 | 0.874 | 0.359 | 41.1 | N/A | N/A |
|  |  | 1 | 0.871 | 0.361 | 41.4 |  |  |
| Andisil 1122 | [structure] | 5 | 0.867 | 0.463 | 53.4 | N/A | N/A |
|  |  | 6 | 0.862 | 0.52 | 60.3 |  |  |
|  |  | 7 | 0.859 | 0.521 | 60.7 |  |  |
|  |  | 8 | 0.859 | 0.567 | 66.0 |  |  |
|  |  | 9 | 0.856 | 0.572 | 66.8 |  |  |
|  |  | 10 | 0.85 | 0.57 | 67.1 |  |  |
| TEOS | [structure] | 5 | 0.872 | 0.371 | 42.5 | N/A | N/A |
|  |  | 6 | 0.872 | 0.399 | 45.8 |  |  |
|  |  | 7 | 0.871 | 0.393 | 45.1 |  |  |
|  |  | 8 | 0.871 | 0.415 | 47.6 |  |  |
|  |  | 9 | 0.871 | 0.423 | 48.6 |  |  |
|  |  | 10 | 0.871 | 0.385 | 44.2 |  |  |
| Dynol 604 | [structure] | 0.25 | 0.875 | 0.369 | 42.2 | 5.8 |  |
|  |  | 0.5 | 0.876 | 0.402 | 45.9 |  |  |
|  |  | 1 | 0.871 | 0.621 | 71.3 |  |  |
|  |  | 2 | 0.873 | 0.566 | 64.8 |  |  |
|  |  | 3 | 0.871 | 0.46 | 52.8 |  |  |
| Oleic acid | [structure] | 1 | 0.871 | 0.401 | 46.0 | 1.0 | 32.5 |
|  |  | 2 | 0.869 | 0.354 | 40.7 |  |  |
|  |  | 3 | 0.868 | 0.335 | 38.6 |  |  |
| Surfynol 104H | [structure] | 1 | 0.872 | 0.382 | 43.8 | 3.0 |  |
|  |  | 2 | 0.868 | 0.28 | 32.3 |  |  |
|  |  | 3 | Powder at surface | Powder at surface | Powder at surface |  |  |
| Envvirogem 360 | ETHYLENE GLYCOL N-BUTYL ETHER | 0.5 | 0.875 | 0.341 | 39.0 |  |  |
|  |  | 1 | 0.874 | 0.383 | 43.8 |  |  |
|  |  | 2 | 0.87 | 0.331 | 38.0 |  |  |
| Triton GR7M | [structure] | 1 | 0.872 | 0.407 | 46.7 | 10.9 |  |
|  |  | 1.5 | 0.873 | 0.424 | 48.6 |  |  |
|  |  | 2 | 0.871 | 0.613 | 70.4 |  |  |
|  |  | 2.5 | 0.871 | 0.604 | 69.3 |  |  |

TABLE 1-continued

| Sample | Structure | Percent (%) | Initital SR | Final SR | SR Retained (%) | HLB Value | Surface Tension (mN/m) |
|---|---|---|---|---|---|---|---|
| Triton X-35 | R—⌬—O—[CH₂CH₂O]ₓ—H<br>R = octyl (C3)<br>x = 3 (avg) | 1<br>2<br>3 | 0.874<br>0.873<br>0.872 | 0.41<br>0.191<br>0.179 | 46.9<br>21.9<br>20.5 | 7.8 | |
| Triton X-15 | (isooctylphenyl) ethoxylate, n avg | 1<br>2<br>3 | 0.87<br>0.87<br>0.869 | 0.424<br>0.221<br>0.253 | 48.7<br>25.4<br>29.1 | 4.9 | |
| Hallcomid M-10 | N,N-DIMETHYLDECANAMIDE (N, N-DIMETHYLCAPRAMIDE)] | 1<br>2<br>3 | 0.872<br>0.871<br>0.87 | 0.422<br>0.377<br>0.359 | 48.4<br>43.3<br>41.3 | 6.0-7.6 | |
| Span-80 LQ | sorbitan monooleate structure | 1<br>2<br>3 | 0.879<br>0.877<br>0.873 | 0.334<br>0.315<br>0.357 | 38.0<br>35.9<br>40.9 | 4.3 | |
| Span 85-NV LQ | sorbitan trioleate structure, R = oleoyl | 1<br>2<br>3 | 0.89<br>0.885<br>0.884 | 0.332<br>0.405<br>0.38 | 37.3<br>45.8<br>43.0 | 1.8 | |
| Merpol A | ALCOHOL PHOSPHATE, Esters, Phosphate Ester | 1<br>2<br>3 | 0.878<br>0.876<br>0.873 | 0.315<br>0.299<br>0.325 | 35.9<br>34.1<br>37.2 | 6.0 | 26.0 |
| Merpol HCS | Alkoxylates, Alcohol Ethoxylates | | | | #DIV/0!<br>#DIV/0!<br>#DIV/0! | 15.3 | 41.0 |
| Hallcomid 1025 | N,N-dimethyl 9-decenamide structure | 1<br>2<br>3 | 0.886<br>0.884<br>0.882 | 0.287<br>0.231<br>0.208 | 32.4<br>26.1<br>23.6 | 6.1 | |
| Stepfac 8181 | TIDECYL ALCOHOL ETHOXYLATE PHOSPHATE ESTER | 1<br>2<br>3 | 0.874<br>0.874<br>0.876 | 0.354<br>0.277<br>0.317 | 40.5<br>31.7<br>36.2 | | 27.4 |
| Makon NF-12 | C10-12 ALCOHOL ALKOXYLATE | 1<br>2<br>3 | 0.875<br>0.875<br>0.872 | 0.504<br>0.533<br>0.553 | 57.6<br>60.9<br>63.4 | 6.0 | 32.7 |

TABLE 1-continued

| Sample | Structure | Percent (%) | Initial SR | Final SR | SR Retained (%) | HLB Value | Surface Tension (mN/m) |
|---|---|---|---|---|---|---|---|
| Zelec 874 | 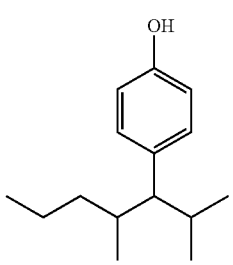 [SMILES: CCCC(C)C(c1ccc(O)cc1)C(C)C] | | | | #DIV/0!<br>#DIV/0!<br>#DIV/0! | Hydroxyl value: 1 | |
| Ninol 40-CO | | 0.25 | 0.875 | 0.412 | 47.1 | 8.0 | 27.9 |
| | | 0.5 | 0.874 | 0.467 | 53.4 | | |
| | | 1 | 0.875 | 0.633 | 72.3 | | |
| | | 2 | 0.875 | 0.628 | 71.8 | | |
| | | 3 | 0.872 | 0.676 | 77.5 | | |
| Cedephos FA-600 | ALKYL ETHER PHOSPHATE | 1 | 0.878 | 0.304 | 34.6 | | 32.3 |
| | | 2 | 0.876 | 0.274 | 31.3 | | |
| | | 3 | 0.874 | 0.334 | 38.2 | | |
| Stepanpol PC-1028P-210 | LINEAR ALIPHATIC/AROMATIC POLYESTER POLYOL | | | | #DIV/0!<br>#DIV/0!<br>#DIV/0! | Hydroxy value: 210 | |
| Rucote 102 | OH FUNCTIONAL POLYESTER | | | | #DIV/0!<br>#DIV/0!<br>#DIV/0! | Hydroxy value: 40 | |
| MicroStep H313 | blend of nonionic surfactants | 1 | 0.873 | 0.465 | 53.3 | | |
| | | 2 | 0.875 | 0.536 | 61.3 | | |
| | | 3 | 0.873 | 0.559 | 64.0 | | |
| PolyStep TSP-16 | Alkoxylates, Tristrylphenol Ethoxylates | 1 | 0.874 | 0.389 | 44.5 | 13.0 | |
| | | 2 | 0.874 | 0.386 | 44.2 | | |
| | | 3 | 0.873 | 0.392 | 44.9 | | |
| Toximul 8000 | POLYOL BLEND | 1 | 0.87 | 0.411 | 47.2 | Hydroxy value: 64 | |
| | | 2 | 0.872 | 0.427 | 49.0 | | |
| | | 3 | 0.87 | 0.431 | 49.5 | | |
| Surfonic CO-5 | polyoxyalkylene (POA) block copolymers | 1 | 0.873 | 0.415 | 47.5 | 3.7 | |
| | | 2 | 0.871 | 0.416 | 47.8 | | |
| | | 3 | 0.87 | 0.439 | 50.5 | | |
| Surfonic N-40 | 4-mole ethoxylate | 1 | 0.873 | 0.604 | 69.2 | 8.9 | |
| | | 2 | 0.874 | 0.67 | 76.7 | | |
| | | 3 | 0.871 | 0.547 | 62.8 | | |

TABLE 1-continued

| Sample | Structure | Percent (%) | Initial SR | Final SR | SR Retained (%) | HLB Value | Surface Tension (mN/m) |
|---|---|---|---|---|---|---|---|
| Surfonic L24-2 | seven-mole ethoxylate of linear, primary 12-14 carbon number alcohol | 1 | 0.87 | 0.601 | 69.1 | 11.9 | |
| | | 2 | 0.87 | 0.631 | 72.5 | | |
| | | 3 | 0.871 | 0.697 | 80.0 | | |
| Surfonic T-2 | $H{-}[O{\sim}]_m{-}N(R){-}[{\sim}O]_n{-}H$ | 1 | 0.872 | 0.547 | 62.7 | 4.6 | |
| | | 2 | 0.87 | 0.55 | 63.2 | | |
| | | 3 | 0.87 | 0.589 | 67.7 | | |

In one embodiment, the preferred surfactants are linear ethoxylate alcohol, Surfonic L24-2, Surfonic N-40, Surfonic T-2, MicroStep H313, Ninol 40-CO, and Makon NF-12.

The surfactant content of the disclosed compositions may range from 0.1 wt % to 5 wt %, from 0.2 wt % to 4 wt %, from 0.3 wt % to 3 wt %, from 0.4 wt % to 2 wt %, or 0.5 wt % to 1 wt %, based on total weight of the composition. In certain embodiments, the surfactant content of the disclosed compositions is about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, 3.6 wt %, about 3.7 wt %, about 3.8 wt %, about 3.9 wt %, about 4.0 wt %, about 4.1 wt %, about 4.2 wt %, about 4.3 wt %, about 41.4 wt %, about 4.5 wt %, 4.6 wt %, about 4.7 wt %, about 4.8 wt %, about 4.9 wt %, and about 5.0 wt % based on total weight of the composition. The surfactant content can be also defined by a range with the endpoints defined by any two numbers above.

c. Pigments

The disclosed compositions can include one or more pigments (e.g., organic or inorganic pigments). Suitable pigments include, but are not limited to, zinc oxide, antimony oxide, zirconium oxide, chromium oxide, iron oxide, lead oxide, zinc sulfide, titanium dioxide (anatase, rutile, or brookite), lithopone, and carbon black. In certain embodiments, the pigment is titanium dioxide.

The pigment content of the disclosed compositions may range from 0 wt % to 15 wt %, from 1 wt % to 12 wt %, from 3 wt % to 10 wt %, from 5 wt % to 8 wt %, based on total weight of the composition. In certain embodiments, the pigment content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The pigment content of the disclosed compositions may range from 0 wt % to 30 wt %, from 0 wt % to 20 wt %, from 1 wt % to 18 wt %, from 3 wt % to 15 wt %, from 8 wt % to 12 wt %, based on binder solids. In certain embodiments, the pigment content of the disclosed compositions is about 1 wt %, about 2 wt %, about 3 wt %, about 4 wt %, 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

Fillers

The disclosed compositions can include one or more filler components. Suitable fillers include, but are not limited to, calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite.

The filler content of the disclosed compositions may range from 0 wt % to 60 wt %, from 10 wt % to 50 wt %, from 15 wt % to 45 wt %, from 15 wt % to 60 wt %, from 30 wt % to 50 wt %, from 30 wt % to 40 wt %, from 40 wt % to 60 wt %, or from 45 wt % to 55 wt %, based on total weight of the composition. In certain embodiments, the filler content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt %, based on total weight of the composition.

The filler content of the disclosed compositions may range from 0 wt % to 95 wt %, from 10 wt % to 90 wt %, from 15 wt % to 85 wt %, from 20 wt % to 80 wt %, from 50 wt % to 80 wt %, from 60 wt % to 80 wt %, or from 70 wt % to 80 wt %, based on binder solids. In certain embodiments, the filler content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, or about 90 wt %, based on binder solids.

e. Crosslinkers

The disclosed compositions can include one or more crosslinker components. Suitable crosslinkers include, but are not limited to, organosilanes containing at least 3 hydrolyzable groups in one molecule and/or its partial hydrolysate. Exemplary hydrolyzable groups in such organosilanes or its partial hydrolysate include a ketoxime group, an alkoxy group, an acetoxy group, and an isopropenoxy group. Suitable crosslinking agents include, but are not limited to, ketoxime silanes such as tetrakis(methylethylketoxime)silane, methyltris(dimethylketoxime)silane, methyltris(methylethylketoxime)silane, ethyltris(methylethylketoxime)silane, methyltris(methyl isobutyl ketoxime)silane, and vinyl tris(methylethylketoxime)silane; alkoxysilanes such as methyltrimethoxysilane, vinyltrimethoxysilane, phenyltrimethoxysilane, and vinyltriethoxy silane; acetoxysilanes such as methyltriacetoxysilane and vinyltriacetoxysilane; isopropenoxy silanes such as methyltriisopropenoxysilane, vinyltriisopropenoxysilane, and phenyltriisopropenoxysilane; and a partial hydrolysate/condensate of such silanes. In certain embodiments, the crosslinker is tris(methylethylketoxime) methylsilane (also referred to as methyltris(methylethylketoxime)silane).

The crosslinker content of the disclosed compositions may range from 0 wt % to 15 wt %, from 1 wt % to 10 wt %, or from 3 wt % to 8 wt %, based on total weight of the composition. In certain embodiments, the crosslinker content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The crosslinker content of the disclosed compositions may range from 0 wt % to 20 wt %, from 1 wt % to 15 wt %, or from 5 wt % to 12 wt %, based on binder solids. In certain embodiments, the crosslinker content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

f. Adhesion Promoters

The disclosed compositions can include one or more adhesion promoters, also referred to as silane coupling agents. Suitable adhesion promoters include those having an alkoxysilyl, a ketoximesilyl, or an alkenoxysilyl group as the hydrolyzable group, and exemplary such compositions include vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxy propyltriisopropenoxysilane, and 3-glycidoxypropylmethyldiisopropenoxysilane. In certain embodiments, the adhesion promoter is 3-aminopropyltriethoxysilane.

The adhesion promoter content of the disclosed compositions may range from 0 wt % to 5 wt %, from 0.5 wt % to 3 wt %, based on total weight of the composition. In certain embodiments, the adhesion promoter content of the disclosed compositions is about 0.5 wt %, about 1.0 wt %, about 1.5 wt %, about 2.0 wt %, about 2.5 wt %, or about 3.0 wt %, based on total weight of the composition.

The adhesion promoter content of the disclosed compositions may range from 0 wt % to 5 wt %, from 0.5 wt % to 3 wt %, based on binder solids. In certain embodiments, the adhesion promoter content of the disclosed compositions is about 0.5 wt %, about 1.0 wt %, about 1.5 wt %, about 2.0 wt %, about 2.5 wt %, about 3.0 wt %, about 3.5 wt %, about 4.0 wt %, about 4.5 wt %, or about 5.0 wt %, based on binder solids.

g. Catalysts

The disclosed compositions can include one or more catalysts. Suitable catalysts include, but are not limited to, organotin catalysts such as dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, and tin laulate; and organotitanium catalysts such as tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate.

The catalyst content of the disclosed compositions may range from 0 wt % to 3 wt %, based on total weight of the composition. In certain embodiments, the catalyst content of the disclosed compositions is 1 wt % or less, 0.5 wt % or less, 0.1 wt % or less, 0.05 wt % or less, about 1 wt %, about 0.5 wt %, about 0.1 wt %, or about 0.05 wt %, based on total weight of the composition.

The catalyst content of the disclosed compositions may range from 0 wt % to 3 wt %, based on binder solids. In certain embodiments, the catalyst content of the disclosed compositions is 1 wt % or less, 0.5 wt % or less, 0.1 wt % or less, 0.05 wt % or less, about 1 wt %, about 0.5 wt %, about 0.1 wt %, or about 0.05 wt %, based on binder solids.

h. Solvents

The disclosed compositions can include one or more solvents. Suitable solvents include, but are not limited to, mineral spirits, toluene, hexane, xylene, or combinations thereof. In certain embodiments, the compositions are solvent-free.

The solvent content of the disclosed compositions may range from 0 wt % to 50 wt %, or from 0 wt % to 20 wt %, based on total weight of the composition. In certain embodiments, the solvent content of the disclosed compositions is 0 wt %, about 5 wt %, about 10 wt %, about 15 wt %, about 20 wt %, about 25 wt %, about 30 wt %, about 35 wt %, about 40 wt %, about 45 wt %, or about 50 wt %, based on total weight of the composition.

i. Additives

The disclosed compositions can include one or more additives. Exemplary additives include, but are not limited to, reinforcing fibers, wetting agents, dispersants, thickeners (rheology modifiers), plasticizers, catalysts, driers, biocides, photoinitiators, processing aids, antioxidants, ageing inhibitors, buffers, and antimicrobials.

The additive content of the disclosed compositions may range from 0 wt % to 60 wt %, based on total weight of the composition. The additive content of the disclosed compositions may range from 0 wt % to 80 wt %, based on binder solids.

III. Properties of Compositions

The disclosed compositions can have a combination of desired properties. The compositions can have improved functional properties (e.g., dirt pick-up resistance, cleanability, color performance, reflective properties, and mechanical properties) or aesthetic properties, or any combination thereof.

a. Reflectivity

Reflectivity or Reflectance can be measured using a StellarNet Miniature Spectrometer, for example.

The disclosed compositions may have a reflectivity of 13% or greater, 14% or greater, 15% or greater, 16% or greater, 17% or greater, 18% or greater, 19% or greater, 20% or greater, 21% or greater, 22% or greater, 23% or greater, 24% or greater, 25% or greater, 26% or greater, 27% or greater, or 28% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 380 nanometers.

The disclosed compositions may have a reflectivity of 75% or greater, 76% or greater, 77'7% or greater, 78% or greater, 79% or greater, 80% or greater, 81% or greater, 82% or greater, 83% or greater, 84% or greater, 85% or greater, 86% or greater, 87% or greater, 88% or greater, 89% or greater, or 90% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 500 nanometers.

The disclosed compositions may have a reflectivity of 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, or 95% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 650 nanometers.

b. Delta L and Delta E ($\Delta L$ and $\Delta E$)

Appearance measurements can be taken before and after a test period (i.e., exposure period) of a coated panel, whether a control or experimental coated panel, with the difference between these before and after measurements calculated to determine changes as a result of the soiling test employed. The measurements may be performed on an exposed panel after the test period relative to an unexposed part of the panel or an unexposed control panel. Colorimetric techniques can be employed to demonstrate the advantageous dirt pick-up resistance or cleanability of the disclosed compositions. Colorimeter measurements can be performed using an X-Rite SP64 Spherical Spectrophotometer, for example. The measurements can be performed on cleaned or uncleaned panels. Panels can be cleaned by, for example, applying a standard detergent solution (e.g., a trisodium phosphate solution), allowing the solution to stand for 5 minutes, and then rinsing with a power washer. In this case, coated panels were simply treated with detergent solution and wiped clean with cold water and a cloth towel. Cleaning the panels prior to measuring delta E reduces variability of results and provides for a more accurate measurement of formulation performance.

The disclosed compositions may have a $\Delta L$ of $-30$ to 0, $-20$ to 0, $-10$ to 0, $-5$ to 0, $-4$ to 0, $-3$ to 0, $-2$ to 0, $-1.5$ to 0, or $-1$ to 0, measured on cleaned panels after a test period of 6 months or greater, 12 months or greater, 18 months or greater, 19 months or greater, 24 months or greater, 30 months or greater, 36 months or greater, 4 years or greater, or 5 years or greater.

The disclosed compositions may have a $\Delta E$ of 15 or less, 10 or less, 5 or less, 4.5 or less, 4.0 or less, 3.5 or less, 3.0 or less, 2.5 or less, 2.0 or less, 1.5 or less, 1.0 or less, 0.9 or less, or 0.8 or less, measured on cleaned panels after a test period of 6 months or greater, 12 months or greater, 18 months or greater, 19 months or greater, 24 months or greater, 30 months or greater, 36 months or greater, 4 years or greater, or 5 years or greater. In certain embodiments, the disclosed compounds may have a $\Delta E$ of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 4.0, about 4.5, or about 5.0, measured on cleaned panels after a test period of 6 months or greater, 12 months or greater, 18 months or greater, 19 months or greater, 24 months or greater, 30 months or greater, 36 months or greater, 4 years or greater, or 5 years or greater.

c. Contact Angle Measurements

Contact angle is measured using standard equipment for sample surfaces over several days of immersion of samples coated with the WRC, commercial and experimental. In the experiment, the samples were immersed in water for 30 days, and the contact angle was measured every 5 days.

The disclosed composition of the present invention may have a contact angle of 100-120°. The contact angle can be 101, 102, 103, 104, 105, 106, 107, 108, 109, 110, 111, 112, 113, 114, 115, 116, 117, 118, 119, and 120°.

In one embodiment of the invention, the contact angle is in the range of from 100° to 120° after 1-30 days of immersion. Stated another way, the contact angle is in the range of from 100° to 120° after:

1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days and 30 days.

Commercial Sample 1, Commercial Sample 2, and the Exp. Formula 1: The results show that the contact angle of DPUR experimental sample remained high, depicting a hydrophobic surface, around 115°, indicating the surfactant was not bleeding out with water immersion. It continued to retain the hydrophobicity and in fact showed a rejuvenation after 20 days. On the other hand, the comparative samples: the standard version Commercial Sample 1 and Commercial Sample 2, showed a decrease in the contact angle in just in few days. The Commercial Sample 2 started at 110° but rapidly dropped to around 95° and stabilized at that level. There was no rejuvenation in the contact angle. The Commercial Sample 1 more or less remained steady above 95°.

Because it is difficult to measure contact angle after dirt soils the surface of the WRC, the contact angle data were not conflated with that of the solar reflectance measurements (10 cycles of dirt test).

IV. Methods of Use

The disclosed compositions can be applied to any selected surface or substrate. For example, the disclosed compositions can be applied to an organic, inorganic, or composite substrate, such as synthetic and natural polymers, wood, metals, glass, mineral substrates such as concrete, plaster, bricks, stones, and ceramics. The compositions can be applied to a wide variety of weathered and unweathered roofing substrates, such as, for example, asphaltic coatings, roofing felts, synthetic polymer membranes, foamed polyurethane (e.g., spray polyurethane foam), metals (e.g., aluminum), modified bitumen membranes; or to previously painted, primed, undercoated, worn, or weathered substrates, such as metal roofs weathered thermoplastic polyolefin, weathered poly(vinyl chloride), weathered silicone rubber, and weathered ethylene propylene diene monomer rubber.

The disclosed compositions can be applied by brushing, spraying, squeegee, pouring, draw down, spin coating, dipping, applying with a roller or curtain coater, the like, and any combination thereof. The compositions can be adjusted to the consistency suitable for use by heating, particularly for spray applications, or by inclusion of one or more solvents.

The thicknesses of coatings of the disclosed compositions will depend upon the specific requirements of the application and the desired level of protection. In certain embodiments, a coating can have an average thickness of 250 to 1500 microns, 200 to 1000 microns, 200 to 750 microns, or 300 to 600 microns. In certain embodiments, a coating can have an average thickness of about 200 microns, about 250 microns, about 300 microns, about 350 microns, about 400 microns, about 450 microns, about 500 microns, about 550 microns, about 600 microns, about 650 microns, about 700 microns, about 750 microns, about 800 microns, about 850 microns, about 900 microns, about 950 microns, or about 1000 microns or greater.

The compositions can be dried at ambient temperature and humidity or at elevated temperature and ambient humidity. In certain embodiments, substrates can be prepared for application of the compositions by cleaning or treatment by physical abrasion, flame ionization, power-washing with water, applying an aqueous cleaning solution, such as, for example, from 5 wt % to 10 wt % trisodium phosphate, or other cleaning agents, followed by power washing with water, or plasma treatment prior to coating.

V. Kits

Disclosed are kits for conveniently and effectively implementing the using the disclosed compositions. Such kits may include one or more components of the disclosed compositions together or in separate vessels, and optionally one or more of instructions, packaging, and dispensers. Kit components may be packaged for either manual or partially or wholly automated practice of the foregoing methods.

EXPERIMENTAL

The foregoing may be better understood by reference to the following examples, which are presented for purposes of illustration and are not intended to limit the scope of the invention.

Example 1

In a 250-mL glass beaker, 7 g of PDMS liquid AK50 was added, followed by an addition of 45 g of reactive PDMS polymer C2T. The content of the beaker was mixed at a low speed of 200 rpm for 1 min to blend the liquid. While the mixer was still on, 2 g of fumed silica was added slowly. Once all fumed silica was added, the mixing speed was increased to 600 rpm for 5 min, until the fumed silica was uniformly dispersed. Then, 6 g of cross-linker BO30 was added. While the mixing was still on, 9 g of TiO2 and 25 g of Minex 3 were slowly add. The mixing speed was increased to 1000 rpm for 10 min, until all the powders were uniformly mixed. The mixer speed was slowed down to 500 rpm, and in sequence, were added 4 g of silicone oil D4; 0.9 g of silane GF91; 0.1 g of tin catalyst CAT41; and 1 g of surfactant L24-2. The mixing was continued for an additional 3 min, at 500 rpm, and then the paint was completed with a total weight of 100 g. The final paint was in white color with a solid content around 92%, and viscosity around 5,000 cPs.

TABLE 2

Exemplary Composition of WRC of Invention

| Ingredients | Supplier | Formula (wt %) | Function |
| --- | --- | --- | --- |
| PDMS Liquid 50/100 CST | Wacker AK50 | 5-10 | Plasticizer |
| Reactive PDMS polymer | Wacker C2T | 40-50 | Silicone Polymer |
| Fumed Silica | Wacker HDK V15 | 1-3 | Rheological Modifier |
| Silane Crosslinker | Wacker BO 30 | 4-8 | Cross-linker |
| $TiO_2$ | Chemours R-960 | 5-15 | White Pigment |
| MINEX 3 | Minex 3 | 20-30 | Filler |
| Silicone Oil D4 | Dow Corning 244 fluid | 2-5 | Solvent |
| Silane | Wacker GF 91 | 0.5-1.0 | Adhesion Promoter |
| Tin Catalyst | Wacker CAT41 | 0.1 | Metal Catalyst |
| Surfactant | Huntsman Surfonic L24-2 | 0.5-2.0 | DPUR Surfactant Additive |

The solar reflectance was measured through the Rapid Rating method. Solar reflectance and the Dirt Management Index were also measured by actual field exposure. Color Change was measured by ΔE. The solar reflectance index is a composite measure of the solar reflectance and the thermal emittance numbers. The Exp. Formula 1 functions much better than other competitors and standard products it is compared to. As seen in FIG. 7, it consistently shows a higher contact angle measurement, that is, a hydrophobic surface.

For the several measurements the following ASTM experimental procedures were used:

ASTM D7897: Standard Practice for Laboratory Soiling and Weathering of Roofing Materials to Simulate Effects of Natural Exposure on Solar Reflectance and Thermal Emittance.

ASTM C1371: Test Method for Determination of Emittance of Materials Near Room Temperature Using Portable Emissometers.

ASTM C1549: Test Method for Determination of Solar Reflectance Near Ambient Temperature Using a Portable Solar Reflectometer. These 3 ASTM standards specify the lab dirts types, thermal emittance and solar reflectance.

ASTM E1980: Standard Practice for Calculating Solar Reflectance Index of Horizontal and Low-Sloped Opaque Surfaces.

TABLE 3

Solar Reflectance, Thermal Emittance and Solar Reflectance Index for Composition of Example 1

| No. | Coating | Solar Reflectance % | | | Thermal Emittance % | | | Solar Reflectance Index | | |
| --- | --- | --- | --- | --- | --- | --- | --- | --- | --- | --- |
| | | Initial | Rapid Rate | Loss | Initial | Rapid Rate | Loss | Initial | Rapid Rate | Loss |
| 1. | Exp. Formula 1 (DPUR Formula) | 88 | 85 | −3 | 90 | 90 | 0 | 111 | 107 | −4 |
| 2. | Commercial Sample 1 | 88 | 83 | −5 | 88 | 88 | 0 | 111 | 104 | −7 |
| 3. | Commercial Sample 2 | 82 | 81 | −1 | 90 | 90 | 0 | 103 | 101 | −2 |
| 4. | Commercial Sample 3 | 88 | 63* | −25 | 87 | 89* | 2 | 111 | 76* | −35 |
| 5. | Commercial Sample 4 | 90 | 76* | −14 | 90 | 88* | −2 | 114 | 94* | −20 |
| 6. | Commercial Sample 5 | 89 | 73* | −16 | 90 | 88* | −2 | 113 | 90* | −23 |
| 7. | Commercial Sample 6 | 87 | 70* | −17 | 89 | 90* | 1 | 110 | 86* | −24 |
| 8. | Commercial Sample 7 | 87 | 70* | −17 | 90 | 90* | 1 | 110 | 86* | −24 |
| 9. | Commercial Sample 8 | 88 | 55* | −33 | 89 | 89* | 1 | 111 | 65* | −46 |
| 10. | Commercial Sample 9 | 84 | 73* | −11 | 91 | 91* | 0 | 106 | 90* | −16 |
| 11. | Commercial Sample 10 | 86 | 80* | −6 | 90 | 90* | 0 | 109 | 100* | −9 |

*Indicates an actual 3-year exposure

TABLE 4

| No. | Coating | Solar Reflectance (%) | | | DM Rating | | | Color Change (Delta E) | | |
| --- | --- | --- | --- | --- | --- | --- | --- | --- | --- | --- |
| | | Initial | 7 m* | Change | Initial** | 7 m* | Change | Initial | 7 m* | Change |
| 1. | Exp. Formula 1 | 88.5 | 70.0 | | 10 | 4.7 | | 0 | 11.9 | |
| 2. | Exp. Formula 2 | 85.8 | 70.3 | | 10 | 5.0 | | 0 | 10.6 | |
| 3. | Commercial Sample 1 | 88.5 | 65.6 | | 10 | 3.0 | | 0 | 14.1 | |
| 4. | Commercial Sample 9 | 84.2 | 75.1 | | 10 | 4.7 | | 0 | 7.3 | |
| 5. | (Commercial Sample 10) | 83.8 | 75.9 | | 10 | 5.0 | | 0 | 7.0 | |

*Months
**10 = white; 0 = black

DESCRIPTION OF DRAWINGS

FIG. 1 Process for DPUR Evaluation

FIG. 1 relates to the laboratory process that was used to evaluate the DPUR with standard dirts. In the first step, 25 g of the dry soiling medium was placed in a bucket along with the coating sample to be evaluated. The bucket was shaken vigorously for 30 s. The sample was removed from the bucket and was washed with water. It was subsequently is dried at 60° C. for 4 hours. The solar reflectance, DM rating, color change and solar reflectance index were calculated using standard techniques described previously in this document.

Figure 2:
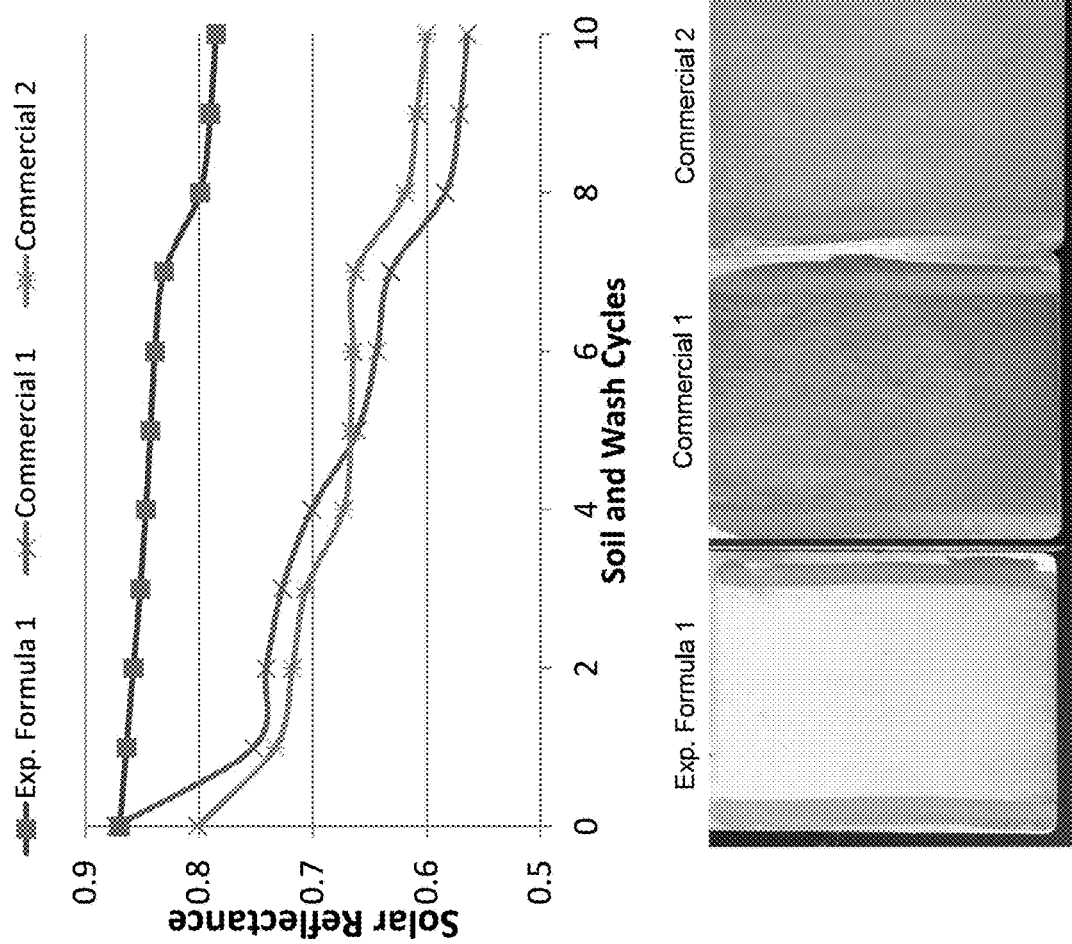
FIG. 2 depicts the validation with fine dirt for three samples: the Exp. Formula 1, Commercial Sample 1, and Commercial Sample 2.

FIG. 2 Fine Dirt Soiling

FIG. 2 depicts validation with fine dirt, and the solar reflectance is shown graphically as function of soil and wash cycles for three samples Commercial Sample 2, Commercial Sample 1, and the Exp. Formula 1. Commercial Sample 2 is a comparative sample of the commercially available DPUR version of WRC Commercial Sample 1 is a standard non-DPUR version of the WRC, which is commercially available.

The solar reflectance deteriorated from about 0.87 to 0.6 and 0.58 for the non-surfactant based comparative samples. For the experimental sample, the solar reflectance was about 0.79 even after ten cycles of soiling and washing. The color of the experimental sample was much better (whiter) than the other two samples.

Figure 3:
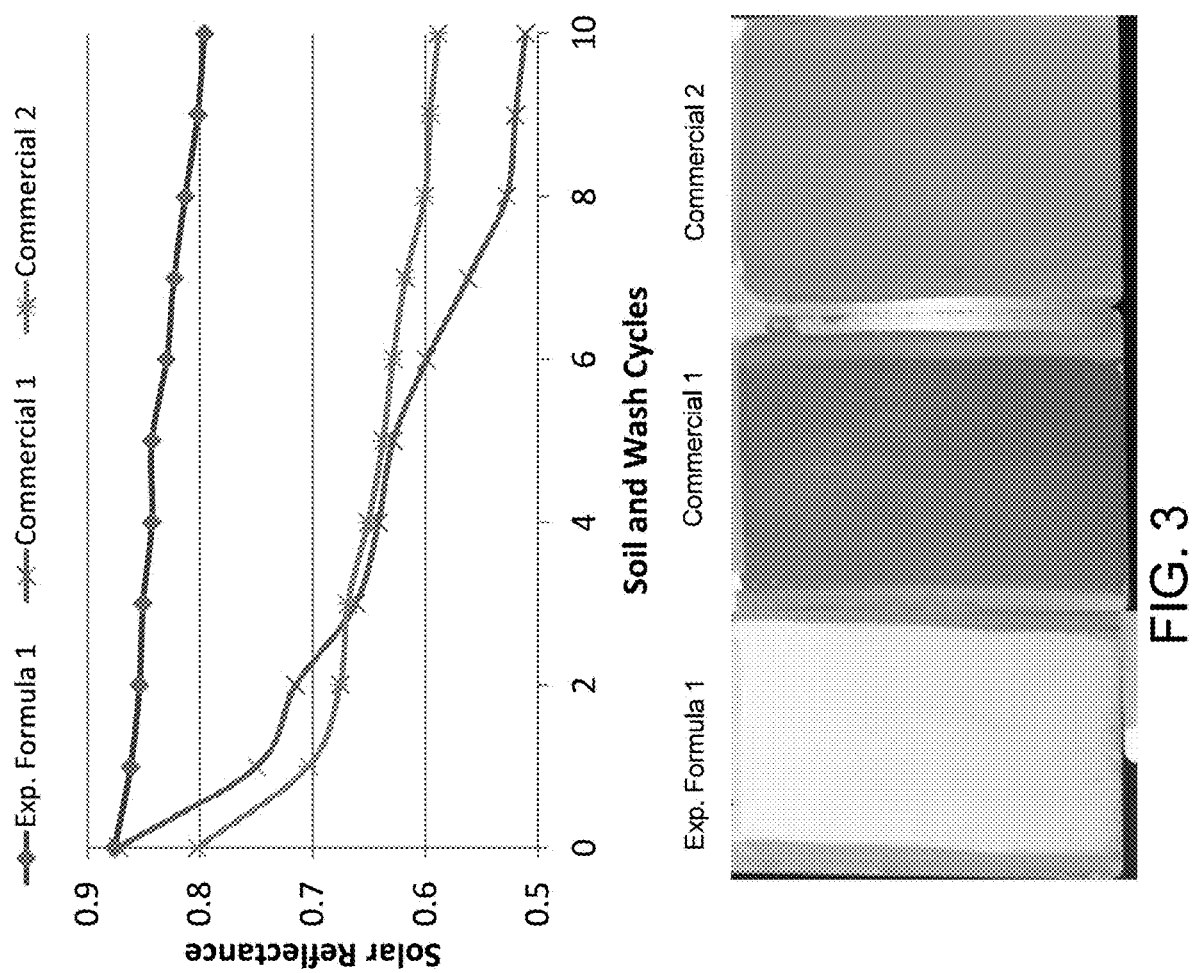
FIG. 3 depicts the validation with medium dirt for three samples: the Exp. Formula 1, Commercial Sample 1, and Commercial Sample 2.

FIG. 3 Medium Dirt Soiling

FIG. 3 depicts validation with medium dirt, and the solar reflectance is shown graphically as function of soil and wash cycles for three samples Commercial Sample 2, Commercial Sample 1, and the Exp. Formula 1.

The solar reflectance deteriorated from about 0.87 to 0.6 for Commercial Sample 2 and from about 0.8 to about 0.59 for the non-surfactant based comparative samples. For the experimental sample, the solar reflectance was about 0.80 even after ten cycles of soil and wash. The color of the experimental sample was much better (whiter) than the other two samples.

Figure 4:
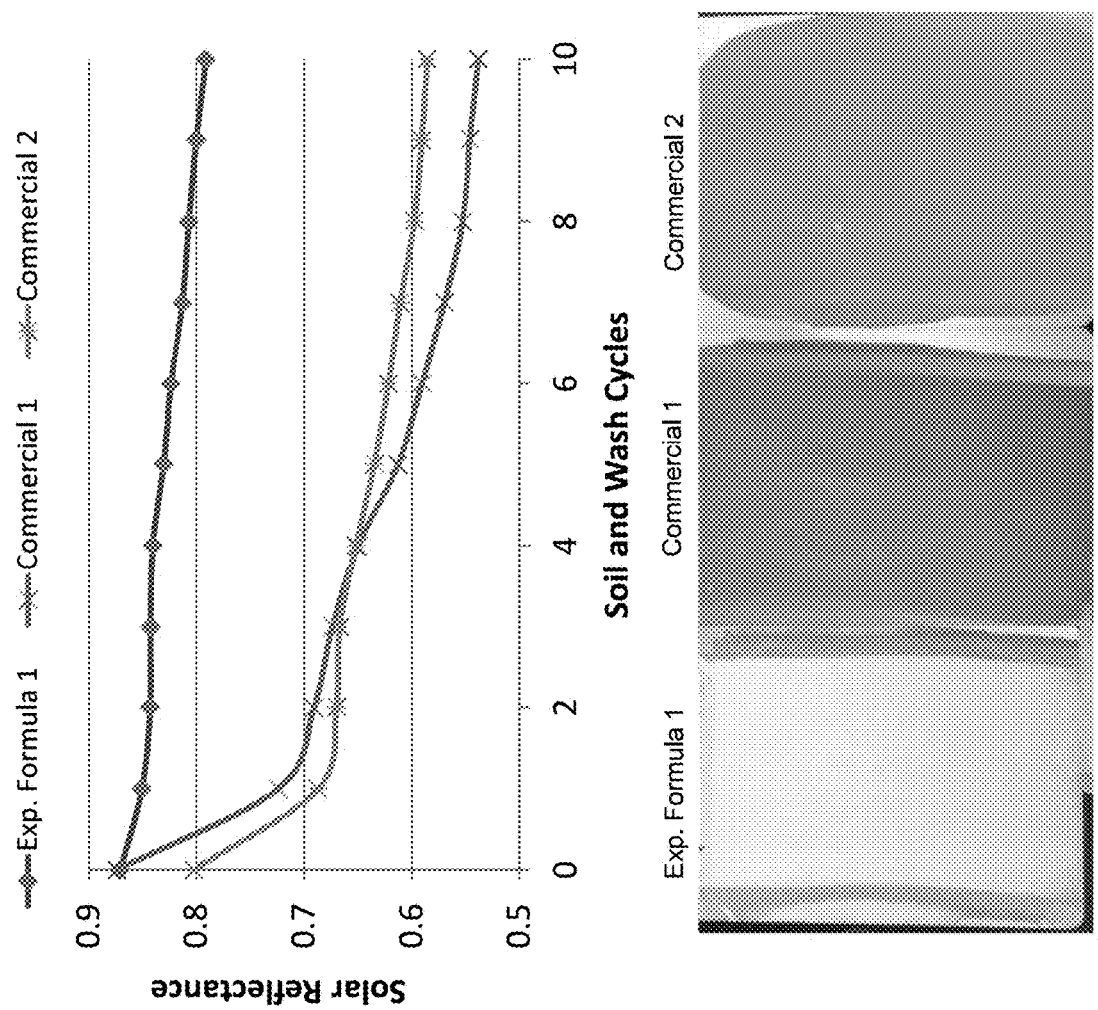
FIG. 4 depicts the validation with coarse dirt for three samples: the Exp. Formula 1, Commercial Sample 1, and Commercial Sample 2.

FIG. 4 Coarse Dirt Soiling

FIG. 4 depicts validation with coarse dirt, and the solar reflectance is shown graphically as function of soil and wash cycles for three samples Commercial Sample 2, Commercial Sample 1, and the Exp. Formula 1.

The solar reflectance deteriorated from about 0.87 to 0.55 and from 0.8 to 0.58 for the non-surfactant based comparative samples. For the experimental sample, which was originally at 0.87, the solar reflectance was about 0.8 even after ten cycles of soil and wash. The color of the experimental sample was much better (whiter) than the other two samples.

FIG. 5

Figure 5:
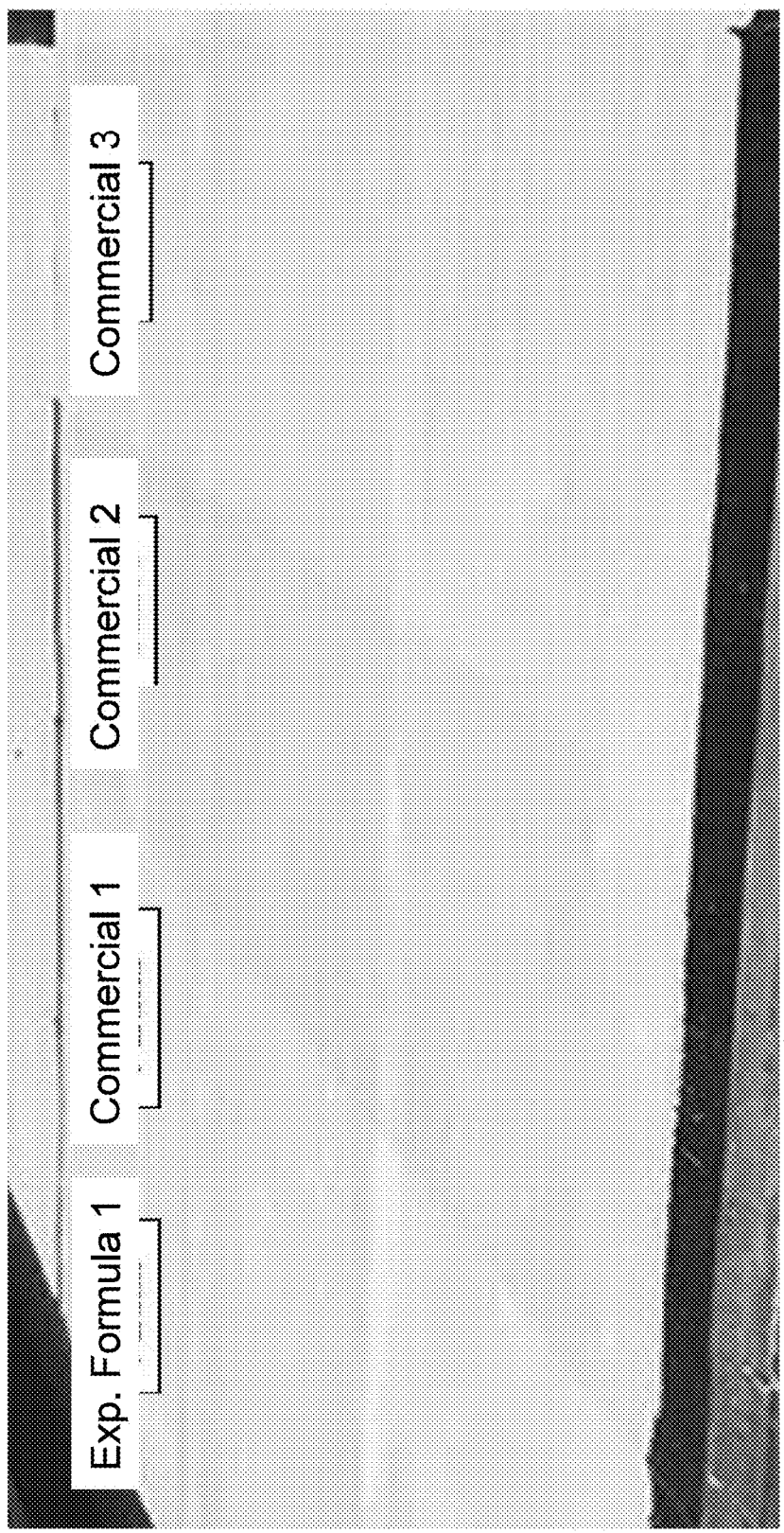
FIG. 5 depicts an actual roof coating application of four samples: Commercial Sample 1, Exp. Formula 1, Commercial Sample 2, and Commercial 3.

FIG. 5 shows the actual roof-coating application after three months of application for four samples, Commercial Sample 1, Exp. Formula 1, Commercial Sample 2, and Commercial Sample 3. The Commercial Sample 2 and Commercial Sample 3 samples are comparative samples. The Exp. Formula 1 samples are experimental samples with surfactant inclusion. It can be seen clearly that the Exp. Formula 1 samples are whiter than the Commercial Sample 2 and Commercial Sample 3 samples.

FIG. 6

FIG. 6 shows the actual roof-coating application after five months of application for four samples, standard versions (Commercial Sample 1) and DPUR versions (Exp. Formula 1). It can be seen clearly that the DPUR samples are whiter than the standard samples.

FIG. 7

FIG. 7 shows the change in contact angle of the surface over several days of immersion of samples coated with Commercial Sample 1, Commercial Sample 2, and the Exp. Formula 1. In the experiment, the samples were immersed in water for 30 days, and the contact angle was measured every 5 days.

The results show that the contact angle of DPUR experimental sample remained high, depicting a hydrophobic surface, around 115°, indicating the surfactant was not bleeding out with water immersion. It continued to retain the hydrophobicity and in fact showed a rejuvenation after 20 days. On the other hand, the comparative samples: the standard version Commercial Sample 1 and Commercial Sample 2, showed a decrease in the contact angle in just in few days. The Commercial Sample 2 started at 110° but rapidly dropped to around 95° and stabilized at that level. There was no rejuvenation in the contact angle. The Commercial Sample 1 more or less remained steady above 95°.

Because it is difficult to measure contact angle after dirt soils the surface of the WRC, the contact angle data were not conflated with that of the solar reflectance measurements (10 cycles of dirt test).

EXEMPLARY EMBODIMENTS

For completeness, various aspects of the invention are set out in the following numbered embodiments:

Embodiment 1. A composition comprising a polysiloxane; an at least one surfactant; a pigment; a filler; a crosslinker; an adhesion promoter; a catalyst; and optionally one or more additives and optionally one or more solvents.

Embodiment 2. The composition of Embodiment 1, comprising 0.1 wt % to 5 wt %, 0.2 wt % to 4 wt %, 0.3 wt % to 3 wt %, 0.4 wt % to 2 wt %, or 0.5 wt % to 1 wt % of the at least one surfactant, based on the polysiloxane content.

Embodiment 3. The composition of Embodiment 1 or Embodiment 2, comprising 5 wt % to 20 wt %, 8 wt % to 17 wt %, or 10 wt % to 15 wt % of the pigment, based on polysiloxane content.

Embodiment 4. The composition of any one of Embodiments 1-3, comprising 60 wt % to 90 wt %, 65 wt % to 85 wt %, or 70 wt % to 80 wt % of the filler, based on polysiloxane content.

Embodiment 5. The composition of any one of Embodiments 1-4, comprising 3 wt % to 15 wt %, 5 wt % to 13 wt %, or 8 wt % to 10 wt % of the crosslinker, based on polysiloxane content.

Embodiment 6. The composition of any one of Embodiments 1-5, comprising 0.5 wt %to 4 wt %, 1 wt %to3.5 wt %, 1.5 wt %to3 wt %,or 2 wt %to 2.5 wt %,of the adhesion promoter, based on polysiloxane content.

Embodiment 7. The composition of any one of Embodiments 1-6, comprising 0.05 wt % to 0.35 wt %, 0.1 wt % to 0.3 wt %, or 0.15 wt % to 0.25 wt % of catalyst, based on polysiloxane content.

Embodiment 8. The composition of Embodiment 1, comprising 35 wt % to 60 wt % polysiloxane; 0.1 wt % to 5 wt % at least one surfactant; 1 wt % to 12 wt % pigment; 10 wt % to 60 wt % filler; 1 wt % to 10 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

Embodiment 9. The composition of Embodiment 1, comprising 55 wt % to 60 wt % polysiloxane; 0.2 wt % to 2 wt % at least one surfactant; 5 wt % to 8 wt % pigment; 30 wt % to 50 wt % filler; 3 wt % to 8 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

Embodiment 10. The composition of any one of Embodiments 1-9, wherein the polysiloxane has formula:

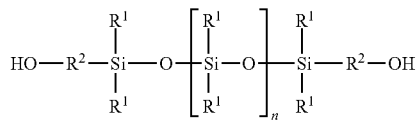

wherein R1 at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl; $R^2$ at each occurrence is independently selected from alkyl, aryl, arylalkyl and a bond; and n ranges from 10 to 1,000, or from 160-250; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents.

Embodiment 11. The composition of any one of Embodiments 1-10, wherein the polysiloxane has formula:

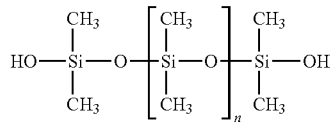

wherein n ranges from 10 to 1,000, or from 160-250.

Embodiment 12. The composition of any one of Embodiments 1-11, wherein the polysiloxane is a hydroxy-terminated polydimethylsiloxane resin having a weight average molecular weight of 1,000 g/mol to 100,000 g/mol and a viscosity of 70 centistoke to 100,000 centistoke.

Embodiment 13. The composition of any one of Embodiments 1-12, wherein the at least one surfactant is selected from the group consisting of alkyl-phenol-ethoxylate surfactant, cationic surfactant, anionic surfactant, non-ionic surfactant, a polyether siloxane-based surfactant and any combination thereof.

Embodiment 14. The composition of any one of Embodiments 1-13, wherein the at least one surfactant is selected from ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

Embodiment 15. The composition of any one of Embodiments 1-14, wherein the pigment is selected from the group consisting of zinc oxide, antimony oxide, zirconium oxide, chromium oxide, iron oxide, lead oxide, zinc sulfide, titanium dioxide, lithopone, and carbon black, or any combination thereof.

Embodiment 16. The composition of any one of Embodiments 1-15, wherein the pigment is titanium dioxide.

Embodiment 17. The composition of any one of Embodiments 1-16, wherein the filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite, or any combination thereof.

Embodiment 18. The composition of any one of Embodiments 1-17, wherein the filler comprises crystalline silica, treated fumed silica, or a combination thereof.

Embodiment 19. The composition of any one of Embodiments 1-18, wherein the crosslinker is selected from the group consisting of ketoxime silanes; alkoxysilanes; acetoxysilanes; isopropenoxy silanes; and a partial hydrolysate/condensate of said silanes; or any combination thereof.

Embodiment 20. The composition of any one of Embodiments 1-19, wherein the crosslinker is methyltris(methylethylketoxime)silane.

Embodiment 21. The composition of any one of Embodiments 1-20, wherein the adhesion promoter is selected from the group consisting of vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxy propyltriisopropenoxysilane, and 3-glycidoxypropylmethyldiisopropenoxysilane, or any combination thereof.

Embodiment 22. The composition of any one of Embodiments 1-21, wherein the adhesion promoter is 3-aminopropyltriethoxysilane.

Embodiment 23. The composition of any one of Embodiments 1-22, wherein the catalyst is selected from the group consisting of dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

Embodiment 24. The composition of any one of Embodiments 1-23, comprising a solvent selected from the group consisting of mineral spirits, toluene, hexane, and xylene, or any combination thereof.

Embodiment 25. The composition of any one of Embodiments 1-24, comprising one or more additives, each independently selected from the group consisting of reinforcing fibers, wetting agents, dispersants, thickeners (rheology modifiers), plasticizers, catalysts, driers, biocides, photoinitiators, processing aids, antioxidants, ageing inhibitors, buffers, and antimicrobials.

Embodiment 26. The composition of any one of Embodiments 1-25, having a polyalkylene glycol content of 0 wt % to 10 wt % or 0 wt % to 20 wt %, based on wt % of binder solids.

Embodiment 27. The composition of any one of Embodiments 1-26, having a polyethylene glycol content of 0 wt % to 10 wt % or 0 wt % to 20 wt %, based on wt % of binder solids.

Embodiment 28. The composition of any one of Embodiments 1-27, wherein at least one of the polysiloxane; the at least one surfactant; the pigment; the filler; the crosslinker; or the adhesion promoter includes a polyalkylene glycol tail.

Embodiment 29. The composition of any one of Embodiments 1-28, wherein at least one of the polysiloxane; the at least one surfactant; the pigment; the filler; the crosslinker; or the adhesion promoter includes a polyalkylene glycol tail that is a polyethylene glycol tail.

Embodiment 30. The composition of Embodiment 28 or Embodiment 29, wherein polyalkylene glycol tail has a weight average molecular weight of about 300 g/mol to about 10,000,000 g/mol.

Embodiment 31. The composition of Embodiment 30, wherein polyalkylene glycol tail has a weight average molecular weight of about 300 g/mol.

Embodiment 32. The composition of any one of Embodiments 1-31, wherein the composition has a reflectivity of 70% or greater after 7 months of exposure in an exterior environment.

Embodiment 33. The composition of any one of Embodiments 1-32, wherein the composition has a reflectivity of 65% or greater after 7 months of exposure in an exterior environment.

Embodiment 34. The composition of any one of Embodiments 1-33, wherein the composition has reflectivity of 85% or greater before and after the rapid rate test.

Embodiment 35. The composition of any one of Embodiments 1-34, wherein the composition has a tensile strength of 100 psi to 2,000 psi, 100 psi to 400 psi, or 200 psi to 400 psi, as measured according to ASTM D412.

Embodiment 36. The composition of any one of Embodiments 1-35, wherein the composition has an elongation at break of 50% to 400% or 50% to 200%, as measured according to ASTM D412.

Embodiment 37. The composition of any one of Embodiments 1-36, wherein the composition has a ΔL of −30 to 0, −20 to 0, −10 to 0, −5 to 0, −4 to 0, −3 to 0, −2 to 0, or −1 to 0 after 10 months of exterior exposure, measured on cleaned test panels relative to an unexposed sample of the composition.

Embodiment 38. The composition of any one of Embodiments 1-37, wherein the composition has a ΔE of 15 or less, 10 or less 5 or less, 4 or less, 3 or less, 2 or less, or 1 or less after 10 months of exterior exposure, measured on cleaned test panels relative to an unexposed sample of the composition.

Embodiment 39. A composition, comprising: a hydroxy-terminated polydimethylsiloxane resin; 2 wt % to 15 wt % of a mixture of 50% β-[3-(2-H-benzotriazole-2-yl)-4-hydroxy-5-tertbutylphenyl]-propionic acid-poly(ethylene glycol) 300-ester and 50% bis{β-[3-(2-H-benzotriazole-2-yl)-4-hydroxy-5-tert.butylphenyl]-prop-ionic acid}-poly(ethylene glycol) 300-ester ("TINUVIN 1130"); 11 wt % to 14 wt % titanium dioxide; 72 wt % to 78 wt % crystalline silica powder; 1 wt % to 3 wt % polydimethylsiloxane treated fumed silica; 8 wt % to 10 wt % methyltris(methylethylketoxime)silane; 1 wt % to 3 wt % (3-aminopropyl)

triethoxysilane; and 0.02 wt % to 0.4 wt % tin catalyst; based on hydroxy-terminated polydimethylsiloxane resin content.

Embodiment 40. A method for providing a protective coating to a surface, the method comprising applying the composition according to any one of Embodiments 1-41 to at least a portion of the surface.

Embodiment 41. The method of Embodiment 40, wherein the surface is an exterior roof of a structure.

Embodiment 42. The method of Embodiment 40 or Embodiment 41, wherein the composition is applied by brushing, spraying, squeegee, pouring, draw down, spin coating, dipping, applying with a roller or curtain coater, the like, and any combination thereof.

Embodiment 43. The method of any one of Embodiments 40-42, wherein the protective coating has an average thickness of 250 to 1500 microns.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A composition comprising a polysiloxane; at least one surfactant; a pigment; a filler; a crosslinker; an adhesion promoter; a catalyst; and optionally one or more additives and optionally one or more solvents, wherein the polysiloxane has formula:

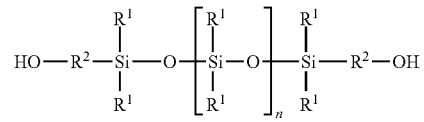

wherein:
$R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;
$R^2$ at each occurrence is independently selected from alkylene, arylene, arylalkylene and a bond; and n ranges from 160-250; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents; and wherein said surfactant has the HLB range of from about 3 to 20.

2. The composition of claim 1, comprising 35 wt % to 60 wt % polysiloxane; 0.1 wt % to 5 wt % surfactant; 1 wt % to 12 wt % pigment; 10 wt % to 60 wt % filler; 1 wt % to 10 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

3. The composition of claim 1, wherein the polysiloxane has a weight average molecular weight of 1,000 g/mol to 100,000 g/mol and a viscosity of 70 centistoke to 100,000 centistoke.

4. The composition of claim 1, wherein the surfactant is selected from the group consisting of ethoxylated alcohols, ethoxylated sorbitan esters, ethoxylated fatty acids, ethoxylated fatty esters, fatty esters, alkyl sulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

5. The composition of claim 1, wherein the pigment is selected from the group consisting of zinc oxide, antimony oxide, zirconium oxide, chromium oxide, iron oxide, lead oxide, zinc sulfide, titanium dioxide, lithopone, carbon black, and any combination thereof.

6. The composition of claim 1, wherein the filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, bentonite, and any combination thereof.

7. The composition of claim 1, wherein the crosslinker is selected from the group consisting of ketoxime silanes; alkoxysilanes; acetoxysilanes; isopropenoxy silanes; a partial hydrolysate/condensate of said silanes; and any combination thereof.

8. The composition of claim 1, wherein the adhesion promoter is selected from the group consisting of vinyltris (2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxy propyltriisopropenoxysilane, 3-glycidoxypropylmethyldiisopropenoxysilane, and any combination thereof.

9. The composition of claim 1, wherein the catalyst is selected from the group consisting of dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, di-tertiary butoxy titanium bismethyl acetoacetate, and any combination thereof.

10. The composition of claim 1, comprising a solvent selected from the group consisting of mineral spirits, toluene, hexane, xylene, and any combination thereof.

11. The composition of claim 1, having a polyalkylene glycol content of 0 wt % to 20 wt %, based on wt % of binder solids.

12. The composition of claim 1, wherein the at least one surfactant is selected from the group consisting of alkylphenol-ethoxylate surfactant, cationic surfactant, anionic surfactant, non-ionic surfactant, a polyether siloxane-based surfactant and any combination thereof.

13. The composition of claim 1, wherein at least one of the polysiloxane; the at least one surfactant; the pigment; the filler; the crosslinker; or the adhesion promoter includes a polyalkylene glycol tail.

14. The composition of claim 1, wherein the composition has a reflectivity of 85% or more before and after the rapid rate measurement.

15. The composition of claim 1, wherein the composition has a ΔL of −30 to 0 after 10 months of exterior exposure, measured on cleaned test panels relative to an unexposed sample of the composition.

16. The composition of claim 1, wherein the composition has a ΔE of 15 or less after 10 months of exterior exposure, measured on cleaned test panels relative to an unexposed sample of the composition.

17. The composition of claim 1, wherein said composition when applied as a coating has a contact angle of at least 100 before and/or after immersion in water for 30 days.

18. A method for providing a protective coating to a surface, the method comprising applying the composition according to claim 1 to at least a portion of the surface.

19. The method of claim 18, wherein the surface is an exterior roof of a structure.

20. A composition, comprising: a polydimethylsiloxane, wherein the polydimethylsiloxane is a polysiloxane that has the formula:

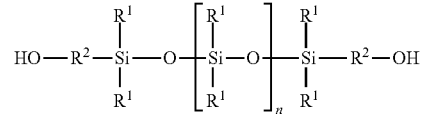

wherein $R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;

$R^2$ at each occurrence is independently selected from alkylene, arylene, arylalkylene and a bond; and n ranges from 10 to 1,000; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents; 0.2-2% of an ethoxylated alcohol as surfactant; 11 wt % to 14 wt % titanium dioxide; 72 wt % to 78 wt % crystalline silica powder; 1 wt % to 3 wt % polydimethylsiloxane treated fumed silica; 8 wt % to 10 wt % methyltris(methylethylketoxime)silane; 1 wt % to 3 wt % (3-aminopropyl)triethoxysilane; and 0.02 wt % to 0.4 wt % tin catalyst; based on polydimethylsiloxane content.

21. The composition as recited in claim 20, wherein said water soluble non-ionic surfactant is the 22-mole ethoxylate of linear, primary 12-14 carbon number alcohol.

22. A composition comprising a polysiloxane; at least one surfactant; a pigment; a filler; a crosslinker; an adhesion promoter; a catalyst; and optionally one or more additives and optionally one or more solvents, wherein the polysiloxane has formula:

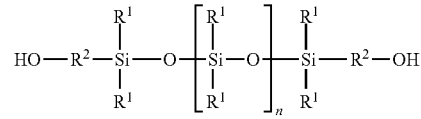

wherein:
R¹ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;
R² at each occurrence is independently selected from alkylene, arylene, arylalkylene and a bond; and n ranges from 10 to 1,000; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents;
wherein said surfactant has the HLB range of from about 3 to 20; and
wherein the composition further comprises a solvent selected from the group consisting of mineral spirits, toluene, hexane, and xylene, and any combination thereof.

23. The composition of claim 22, comprising 35 wt % to 60 wt % polysiloxane; 0.1 wt % to 5 wt % surfactant; 1 wt % to 12 wt % pigment; 10 wt % to 60 wt % filler; 1 wt % to 10 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

24. The composition of claim 22, wherein n ranges from 160-250.

25. The composition of claim 22, wherein the polysiloxane has a weight average molecular weight of 1,000 g/mol to 100,000 g/mol and a viscosity of 70 centistoke to 100,000 centistoke.

26. The composition of claim 22, wherein the surfactant is selected from the group consisting of ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulfates, amide ethoxylates and any combination thereof.

27. The composition of claim 22, wherein the pigment is selected from the group consisting of zinc oxide, antimony oxide, zirconium oxide, chromium oxide, iron oxide, lead oxide, zinc sulfide, titanium dioxide, lithopone, carbon black, and any combination thereof.

28. The composition of claim 22, wherein the filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, bentonite, and any combination thereof.

29. The composition of claim 22, wherein the crosslinker is selected from the group consisting of ketoxime silanes; alkoxysilanes; acetoxysilanes; isopropenoxy silanes; a partial hydrolysate/condensate of said silanes; and any combination thereof.

30. The composition of claim 22, wherein the adhesion promoter is selected from the group consisting of vinyl tris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxy propyltriisopropenoxysilane, 3-glycidoxypropylmethyldiisopropenoxysilane, and any combination thereof.

31. The composition of claim 22, wherein the catalyst is selected from the group consisting of dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, di-tertiary butoxy titanium bismethyl acetoacetate, and any combination thereof.

32. The composition of claim 22, having a polyalkylene glycol content of 0 wt % to 20 wt %, based on wt % of binder solids.

33. The composition of claim 22, wherein the at least one surfactant is selected from the group consisting of alkylphenol-ethoxylate surfactant, cationic surfactant, anionic surfactant, non-ionic surfactant, a polyether siloxane-based surfactant and any combination thereof.

34. The composition of claim 22, wherein at least one of the polysiloxane; the at least one surfactant; the pigment; the filler; the crosslinker; or the adhesion promoter includes a polyalkylene glycol tail.

35. The composition of claim 22, wherein the composition has a reflectivity of 85% or more before and after the rapid rate measurement.

36. The composition of claim 22, wherein the composition has a ΔL of −30 to 0 after 10 months of exterior exposure, measured on cleaned test panels relative to an unexposed sample of the composition.

37. The composition of claim 22, wherein the composition has a ΔE of 15 or less after 10 months of exterior exposure, measured on cleaned test panels relative to an unexposed sample of the composition.

38. The composition of claim 22, wherein said composition when applied as a coating has a contact angle of at least 100 before and/or after immersion in water for 30 days.

39. A method for providing a protective coating to a surface, the method comprising applying the composition according to claim 22 to at least a portion of the surface.

40. The method of claim 39, wherein the surface is an exterior roof of a structure.

41. A method for providing a protective coating to a surface, the method comprising applying the composition to at least a portion of the surface, wherein the surface is an exterior roof of a structure, wherein the composition comprises a polysiloxane; at least one surfactant; a pigment; a filler; a crosslinker; an adhesion promoter; a catalyst; and optionally one or more additives and optionally one or more solvents, wherein the polysiloxane has formula:

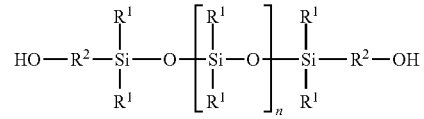

wherein:

$R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;

$R^2$ at each occurrence is independently selected from alkylene, arylene, arylalkylene and a bond; and n ranges from 10 to 1,000; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents;

wherein said surfactant has the HLB range of from about 3 to 20.

* * * * *